(12) United States Patent
Murata et al.

(10) Patent No.: US 11,169,419 B2
(45) Date of Patent: Nov. 9, 2021

(54) PHOTO-ALIGNMENT FILM, RETARDATION SUBSTRATE, LIQUID CRYSTAL DISPLAY DEVICE, AND METHOD FOR PRODUCING PHOTO-ALIGNMENT FILM

(71) Applicant: SHARP KABUSHIKI KAISHA, Sakai (JP)

(72) Inventors: Koji Murata, Sakai (JP); Akira Sakai, Sakai (JP); Yuichi Kawahira, Sakai (JP); Takako Koide, Sakai (JP); Masahiro Hasegawa, Sakai (JP); Kiyoshi Minoura, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/831,657

(22) Filed: Mar. 26, 2020

(65) Prior Publication Data

US 2020/0310200 A1    Oct. 1, 2020

Related U.S. Application Data

(60) Provisional application No. 62/826,782, filed on Mar. 29, 2019.

(51) Int. Cl.
 *G02F 1/1337* (2006.01)

(52) U.S. Cl.
 CPC .... *G02F 1/133788* (2013.01); *C09K 2323/00* (2020.08); *C09K 2323/02* (2020.08); *G02F 1/133711* (2013.01); *G02F 2202/36* (2013.01)

(58) Field of Classification Search
 CPC ......... G02F 1/133788; G02F 1/133711; G02F 1/13378; G02F 1/133796; C09K 19/56; C09K 2323/00; C09K 2323/02
 USPC ........................... 428/1.1, 1.2, 557; 349/123
 See application file for complete search history.

(56) References Cited

FOREIGN PATENT DOCUMENTS

JP      H01-113733 A      5/1989
JP      2008-268309 A     11/2008

*Primary Examiner* — Ruiyun Zhang
(74) *Attorney, Agent, or Firm* — ScienBiziP, P.C.

(57) ABSTRACT

A photo-alignment film of the present invention includes a polymer layer containing a photoreactive polymer and metal nanoparticles dispersed in the polymer layer at a concentration of $10^9$ particles/(cm$^2$×100 nm) or more and $10^{19}$ particles/(cm$^2$×100 nm) or less. The metal nanoparticles have an absorption peak in a wavelength region of 420 nm or less. An absorbance A1 at the absorption peak of the metal nanoparticles and an absorbance A2 at an absorption peak of the polymer layer satisfy a relationship represented by the following formula 1:

$0.2 \leq A1/A2 \leq 25$     (Formula 1).

10 Claims, 8 Drawing Sheets

PHOTO-ALIGNMENT FILM, RETARDATION SUBSTRATE, LIQUID CRYSTAL DISPLAY DEVICE, AND METHOD FOR PRODUCING PHOTO-ALIGNMENT FILM

CROSS-REFERENCE TO RELATED APPLICATIONS

The present application claims priority under 35 U.S.C. § 119 to U.S. Provisional Application No. 62/826,782 filed on Mar. 29, 2019, the contents of which are incorporated herein by reference in their entirety.

BACKGROUND OF THE INVENTION

Field of the Invention

The present invention relates to a photo-alignment film, a retardation substrate, a liquid crystal display device, and a method for producing a photo-alignment film

Description of Related Art

Liquid crystal display devices (also referred to as liquid crystal display elements) are display devices that use liquid crystal compositions for display, and the typical display mode thereof is irradiating a liquid crystal panel containing a liquid crystal composition sealed between a pair of substrates with backlight and applying voltage to the liquid crystal composition to change the alignment of liquid crystal molecules, thereby controlling an amount of light passing through the liquid crystal panel.

In a liquid crystal display device, the alignment of liquid crystal molecules with no voltage applied is typically controlled by alignment films. The alignment film can be obtained, for example, by applying a liquid crystal aligning agent onto a substrate and performing an alignment treatment on the resultant coated film.

The alignment treatment applied to an alignment film has conventionally been widely performed by the rubbing method of rubbing the surface of the alignment film with a roller or the like. In order to deal with this problem, recently, a photo-alignment method which is an alternative alignment treatment method to the rubbing method and irradiates the surface of an alignment film with light has been widely developed. The photo-alignment method is different from a rubbing treatment because alignment treatment can be performed without being in contact with the surface of an alignment film and has an advantage that generation of contaminants, dust and the like can be suppressed during the alignment treatment. The alignment film subjected to the alignment treatment by the photo-alignment method is also called a photo-alignment film.

As a technique relating to an alignment film included in a liquid crystal display device, for example, JP-A-1-113733 discloses a liquid crystal display element including a pair of glass substrates at least one of which is transparent, a pair of electrode layers formed on an inner surface of the pair of glass substrates, a pair of polymer alignment films formed on the surfaces of the pair of electrode layers and arranged so as to face each other, and a liquid crystal layer formed between the pair of polymer alignment films. In this liquid crystal display element, UV opaque inorganic ultrafine particles having a particle size of 0.01 to 1 μm are dispersed inside at least one inside of a polymer alignment film disposed on at least an inner surface side of the transparent glass substrate, and a polymer protective film disposed as necessary and formed on an outer surface of the transparent glass substrate.

JP-A-2008-268309 discloses a liquid crystal display element which includes a pair of transparent substrates which are arranged substantially in parallel and at least one of which is transparent, a pair of alignment films arranged inside each substrate, and a liquid crystal material filled between the pair of alignment films and in which an alignment treatment is applied to a surface of the alignment film such that liquid crystal molecules in the liquid crystal material are oriented in the same direction. In this liquid crystal display element, the alignment film contains nanoparticles having ferroelectricity.

BRIEF SUMMARY OF THE INVENTION

The photo-alignment film is used not only for controlling alignment of liquid crystal molecules in a liquid crystal display device as described above, but also for a retardation substrate having a retardation layer. The retardation substrate includes, for example, a photo-alignment film and a retardation layer including a compound having a mesogen group and provided on a photo-alignment film. Alignment of the mesogenic group contained in the retardation layer is controlled by the photo-alignment film.

In order for the photo-alignment film to exert a sufficient alignment function, it is necessary to irradiate the photo-alignment film with a sufficient irradiation amount of polarized ultraviolet light. However, if a tact time in a factory is determined, it may be difficult to apply the sufficient irradiation amount of polarized ultraviolet light during the time of transporting a substrate provided with a photo-alignment film. As a result, the alignment function of the photo-alignment film is not sufficiently exerted, and a retardation substrate using the photo-alignment film has a problem that the optical performance (particularly, contrast ratio) is poor. The alignment function of the photo-alignment film means a function of aligning target molecules (usually arranged on the photo-alignment film).

According to the technique of JP-A-1-113733, by dispersing the UV opaque inorganic ultrafine particles inside the polymer alignment film, it is possible to prevent ultraviolet degradation of a liquid crystal and increase durability of the liquid crystal display element. In addition, since transparency can be ensured by preventing clouding, the function of the liquid crystal display element is not hindered. However, JP-A-1-113733 uses the alignment film subjected to an alignment treatment by a rubbing method, and does not consider a problem in the case of using a photo-alignment film.

In JP-A-2008-268309, it is conceivable that by including nanoparticles having ferroelectricity in the alignment film, a local electric field due to a spontaneous polarization of the nanoparticles affects an electron distribution of the liquid crystal material located near the alignment film, attraction caused by hydrogen bonding between liquid crystal molecules and the like, that is, the effective elastic force is weakened, and when voltage is applied, rise of liquid crystal molecules near the alignment film becomes steep, so that light leakage can be suppressed. However, JP-A-2008-268309 uses the alignment film subjected to an alignment treatment by a rubbing method, and does not consider a problem in the case of using a photo-alignment film.

The present invention has been made in view of such a current state of the art and aims to provide a photo-alignment film having an excellent alignment function, a retardation substrate including the photo-alignment film, and a liquid crystal display device including the photo-alignment film.

(1) An embodiment of the present invention is directed to a photo-alignment film including a polymer layer containing a photoreactive polymer, and metal nanoparticles dispersed in the polymer layer at a concentration of $10^9$ particles/($cm^2 \times 100$ nm) or more and $10^{19}$ particles/($cm^2 \times 100$ nm) or less. In this photo-alignment film, the metal nanoparticles have an absorption peak in a wavelength region of 420 nm or less, and an absorbance A1 at the absorption peak of the metal nanoparticles and an absorbance A2 at an absorption peak of the polymer layer satisfy a relationship represented by the following formula 1:

$$0.2 \leq A1/A2 \leq 25 \quad \text{(Formula 1)}$$

(2) Further to the constitution of the above (1), an embodiment of the present invention is directed to a photo-alignment film, in which the absorbance A1 and the absorbance A2 satisfy a relationship represented by the following formula 2:

$$1 \leq A1/A2 \quad \text{(Formula 2)}$$

(3) Further to the constitution of the above (1) or (2), an embodiment of the present invention is directed to a photo-alignment film, in which the metal nanoparticles have the absorption peak in a wavelength region of 300 nm or less.

(4) Further to the constitution of the above (1), (2), or (3), an embodiment of the present invention is directed to a photo-alignment film including the metal nanoparticles at a concentration of $10^{10}$ particles/($cm^2 \times 100$ nm) or more and $10^{18}$ particles/($cm^2 \times 100$ nm) or less in the polymer layer.

(5) Further to the constitution of the above (1), (2), (3), or (4), an embodiment of the present invention is directed to a photo-alignment film in which the metal nanoparticles contain at least one substance selected from the group consisting of silver, aluminum, indium, and alloys thereof.

(6) Further to the constitution of the above (1), (2), (3), (4), or (5), an embodiment of the present invention is directed to a photo-alignment film further including a light emitting body.

(7) Further to the constitution of the above (6), an embodiment of the present invention is directed to a photo-alignment film, in which the light emitting body has an absorption peak in a wavelength region of 300 nm or more and 400 nm or less and has an emission peak in a wavelength region of more than 400 nm and 450 nm or less.

(8) Another embodiment of the present invention is directed to a retardation substrate including the photo-alignment film according to the above (1), (2), (3), (4), (5), (6), or (7) and a retardation layer containing a polymer having a mesogen group and a reactive group and provided on the photo-alignment film.

(9) Another embodiment of the present invention is directed to a liquid crystal display device including the photo-alignment film according to the above (1), (2), (3), (4), (5), (6), or (7).

(10) Another embodiment of the present invention is directed to a method for producing a photo-alignment film including polymer layer forming of applying onto a substrate a photo-alignment film material containing a photo-reactive polymer and metal nanoparticles having an absorption peak in a wavelength region of 420 nm or less to form a polymer layer in which the metal nanoparticles are dispersed at a concentration of $10^9$ particles/($cm^2 \times 100$ nm) or more and $10^{19}$ particles/($cm^2 \times 100$ nm) or less, and ultraviolet light irradiation of applying polarized ultraviolet light to the polymer layer. In this method, an absorbance A1 at the absorption peak of the metal nanoparticles and an absorbance A2 at an absorption peak of the polymer layer satisfy a relationship represented by the following formula 1:

$$0.2 \leq A1/A2 \leq 25 \quad \text{(Formula 1)}$$

The present invention can provide a photo-alignment film having an excellent alignment function, a retardation substrate including the photo-alignment film, a liquid crystal display device including the photo-alignment film, and a method for producing a photo-alignment film.

DETAILED DESCRIPTION OF THE INVENTION

Hereinafter, embodiments of the present invention will be described. The present invention is not limited to the contents described in the following embodiments, but can be appropriately modified in design within the range that satisfies the configuration of the present invention.

Embodiment 1

Figure 1:
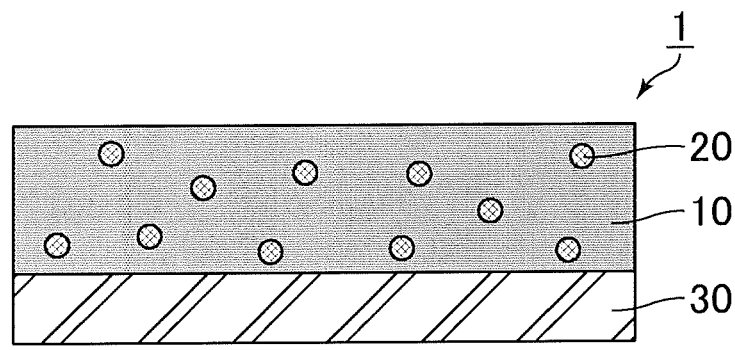
FIG. 1 is a schematic cross-sectional view of a photo-alignment film of Embodiment 1.

FIG. 1 is a schematic cross-sectional view of a photo-alignment film of the present embodiment. As shown in FIG. 1, a photo-alignment film 1 according to the present embodiment has a polymer layer 10, containing a photoreactive polymer, and metal nanoparticles 20 dispersed in the polymer layer 10 at a concentration of $10^9$ particles/(cm$^2$×100 nm) or more and $10^{19}$ particles/(cm$^2$×100 nm) or less. The metal nanoparticles 20 have an absorption peak in a wavelength region of 420 nm or less, and an absorbance A1 at the absorption peak of the metal nanoparticles 20 and an absorbance A2 at the absorption peak of the polymer layer 10 satisfy a relationship represented by the following formula 1:

$$0.2 \leq A1/A2 \leq 25 \quad \text{(Formula 1)}$$

Hereinafter, an alignment treatment step for the photo-alignment film 1 of the present embodiment will be described. Here, as described below, the photo-alignment film 1 of the present embodiment is obtained by applying polarized ultraviolet light to the polymer layer 10 in which the metal nanoparticles 20 are dispersed and performing an alignment treatment on the polymer layer 10. Before and after irradiation with polarized ultraviolet light, the wavelength at the absorption peak of the polymer layer 10 is the same, and the absorbance at the absorption peak of the polymer layer 10 is the same. Before and after irradiation with polarized ultraviolet light, the wavelength at the absorption peak of the metal nanoparticles 20 is the same, and the absorbance at the absorption peak of the metal nanoparticles 20 is the same. Here, the expression that the wavelength at the absorption peak is the same before and after irradiation with polarized ultraviolet light includes a case where the wavelength at the absorption peak before and after irradiation with polarized ultraviolet light is substantially the same. The expression that the absorbance at the absorption peak is the same before and after irradiation with polarized ultraviolet light includes a case where the absorbance at the absorption peak before and after irradiation with polarized ultraviolet light is substantially the same. The absorption peak in this specification means a point where in an absorption spectrum where absorbance is plotted with respect to wavelength, the absorbance has a maximum value. The expression that having an absorption peak in a specific wavelength region means that the wavelength at the absorption peak exists in the specific wavelength region.

Figure 2:
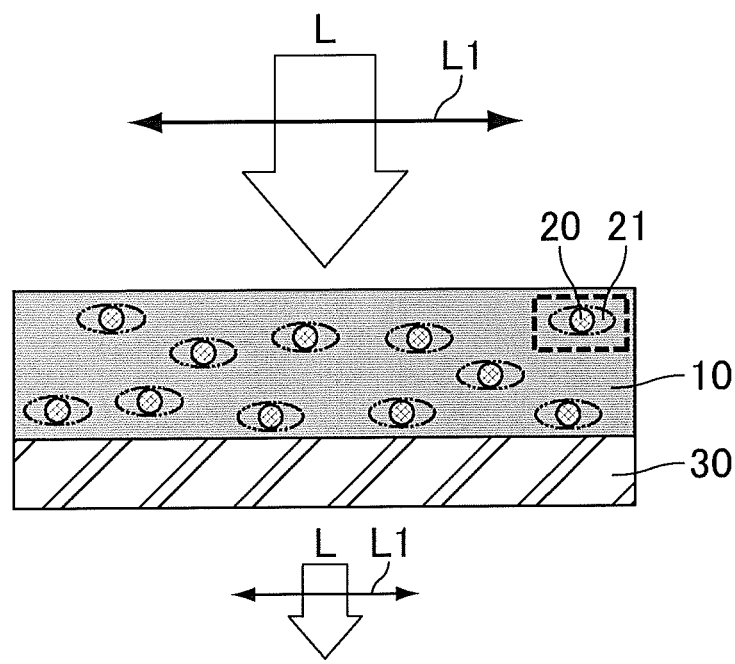
FIG. 2 is a view in an alignment treatment step of the photo-alignment film of Embodiment 1, and is a schematic cross-sectional view showing a state in which polarized ultraviolet light is applied to a polymer layer in which metal nanoparticles are dispersed.
Figure 3:
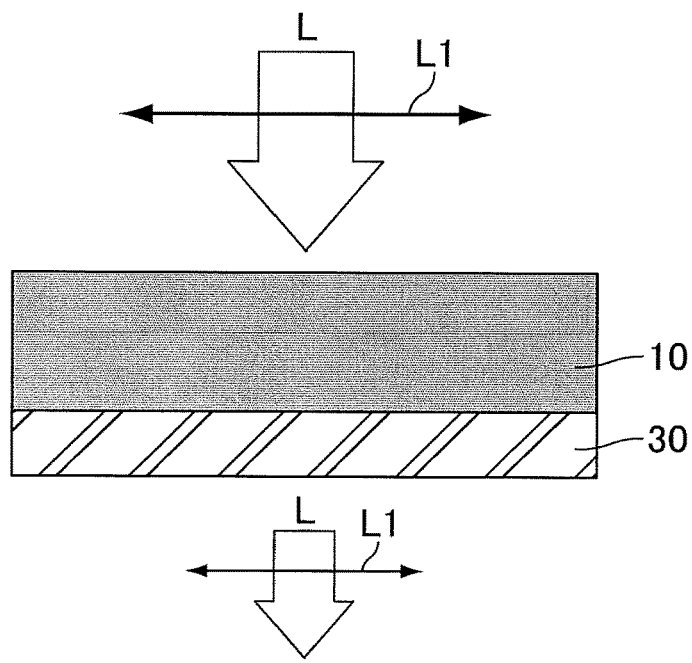
FIG. 3 is a view in an alignment treatment step for a photo-alignment film of Comparative embodiment 1, and is a schematic cross-sectional view showing a state in which polarized ultraviolet light is applied to a polymer layer.
Figure 4:
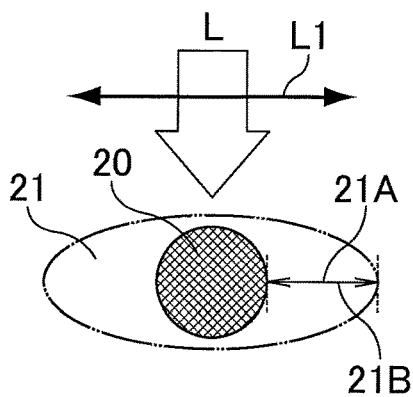
FIG. 4 is a view in the alignment treatment step for the photo-alignment film of Embodiment 1, and is a schematic view showing a state in which an enhanced electric field is generated near the metal nanoparticles.

FIG. 2 is a view in the alignment treatment step for the photo-alignment film of Embodiment 1, and is a schematic cross-sectional view showing a state in which polarized ultraviolet light is applied to the polymer layer in which metal nanoparticles are dispersed. FIG. 3 is a view in an alignment treatment step for a photo-alignment film of Comparative embodiment 1, and is a schematic cross-sectional view showing a state in which polarized ultraviolet light is applied to a polymer layer. FIG. 4 is a view in the alignment treatment step for the photo-alignment film of Embodiment 1, and is a schematic view showing a state in which an enhanced electric field is generated near the metal nanoparticles. FIG. 4 is an enlarged schematic view of a region surrounded by a broken line in FIG. 2.

In the present embodiment, as shown in FIG. 2, a photo-alignment film material containing the photoreactive polymer and the metal nanoparticles 20 is applied onto a substrate 30 and irradiated with polarized ultraviolet light L, whereby the photo-alignment film 1 including the polymer layer 10 in which the metal nanoparticles 20 are dispersed can be produced.

Here, a description will be given of the alignment treatment step for the photo-alignment film of Comparative embodiment 1 having the same configuration as that of the photo-alignment film of Embodiment 1 except that metal nanoparticles are not contained. As shown in FIG. 3, when the polymer layer 10 provided on the substrate 30 is irradiated with the polarized ultraviolet light L in a polarization direction L1 in the alignment treatment step for the photo-alignment film of Comparative embodiment 1, the irradiated polarized ultraviolet light L is partially absorbed by the polymer layer 10 containing the photoreactive polymer. However, the polymer layer 10 alone cannot sufficiently absorb the irradiated polarized ultraviolet light L, so that most of the polarized ultraviolet light L is transmitted (most of the polarized ultraviolet light L is lost). When an absorption amount of the polarized ultraviolet light L is not sufficient, an alignment function of the photo-alignment film cannot be sufficiently exerted.

However, in the present embodiment, since the photo-alignment film 1 contains, in addition to the polymer layer 10, the metal nanoparticles 20 having an absorption peak in a wavelength region of 420 nm or less, in the alignment treatment step for the photo-alignment film 1, the polarized ultraviolet light L having not been absorbed by the polymer layer 10 can be absorbed by the metal nanoparticles 20. Then, as shown in FIG. 4, due to the energy of the polarized ultraviolet light L absorbed by the metal nanoparticles 20, collective vibration (referred to as plasmon resonance) of electrons of the metal nanoparticles 20 occurs, and near the metal nanoparticles 20, an enhanced electric field 21 is formed in a direction parallel to the polarization direction of the entering polarized ultraviolet light L. The enhanced electric field 21 acts on the polymer layer 10 near the metal nanoparticles 20, changes the structure of the photoreactive polymer contained in the polymer layer 10 near the metal nanoparticles 20, and can exert an alignment function. As described above, in the present embodiment, by dispersing the metal nanoparticles 20 in the polymer layer 10, in the alignment treatment step for the photo-alignment film 1, the energy absorbed by the metal nanoparticles 20 can be effectively utilized, and the alignment function of the photo-alignment film 1 can be further exerted while suppressing an irradiation amount of the polarized ultraviolet light L. As a result, the photo-alignment film 1 having an excellent alignment function can be obtained. On the other hand, in JP-A-1-113733 described above, non-polarized ultraviolet light is merely absorbed by the UV opaque inorganic ultrafine particles, and the energy of the ultraviolet light cannot be effectively utilized. JP-A-2008-268309 does not disclose nanoparticles absorbing ultraviolet light.

In the present embodiment, the concentration of the metal nanoparticles 20 in the polymer layer 10 is $10^9$ particles/(cm$^2$×100 nm) or more. Here, a range affected by the enhanced electric field 21 generated by the plasmon resonance is determined by the concentration of the metal nanoparticles 20, and an electric field strength of the enhanced electric field 21 is determined by the absorbance of the metal nanoparticles 20. Since the absorbance is proportional to the concentration, when the concentration of the metal nanoparticles increases, the range affected by the enhanced electric field 21 increases, and the electric field strength of the enhanced electric field 21 increases. When the concentration of the metal nanoparticles 20 in the photo-alignment film 1 is less than $10^9$ particles/(cm$^2$×100 nm), the range affected by the enhanced electric field 21 is narrow, and the electric field strength of the enhanced electric field 21 is weak. Therefore, the enhanced electric field 21 cannot sufficiently act on the entire polymer layer 10, and the alignment function of the photo-alignment film cannot be sufficiently exerted. On the other hand, in the present embodiment, by increasing the concentration of the metal nanoparticles 20 in the photo-alignment film 1 to $10^9$ particles/(cm$^2$×100 nm) or more, the enhanced electric field 21 having a larger electric field strength can act on the entire polymer layer 10, and the alignment function of the optical alignment film 1 can be sufficiently exerted. As a result, the photo-alignment film 1 having an excellent alignment function can be obtained. Here, the unit of "particles/(cm$^2$×100 nm)" is a unit used to represent the number of substances contained in a film, and represents the number of substances contained per 100 nm in film thickness and 1 cm$^2$ of an area. In the present embodiment, the concentration of the metal nanoparticles 20 in the photo-alignment film 1 (also referred to as the concentration in the film) is represented by the unit of "particles/(cm$^2$×100 nm)". However, the concentration in the film may be represented by another unit, and, for example, "X particles/(cm$^2$×100 nm)" is equivalent to "X×10$^2$ substances/mm$^3$". X represents an arbitrary positive number.

In the present embodiment, the concentration of the metal nanoparticles 20 in the photo-alignment film 1 is $10^{19}$ particles/(cm$^2$×100 nm) or less. Here, when the concentration of the metal nanoparticles 20 in the photo-alignment film 1 exceeds $10^{19}$ particles/(cm$^2$×100 nm), it is difficult to form the photo-alignment film so as not to aggregate the metal nanoparticles 20. Particle aggregation caused by an excessively high particle concentration of the metal nanoparticles 20 causes in-plane unevenness and a shift in resonance wavelength, so that the alignment function of the photo-alignment film cannot be sufficiently exerted, and in a liquid crystal display device including the photo-alignment film, the contrast ratio may be reduced. On the other hand, in the present embodiment, by reducing the concentration of the metal nanoparticles 20 in the photo-alignment film 1 to $10^{19}$ particles/(cm$^2$×100 nm) or less, the occurrence of the aggregation of the metal nanoparticles 20 is suppressed, and the in-plane unevenness and the shift of the resonance wavelength can be suppressed. As a result, the alignment function of the photo-alignment film 1 is sufficiently exerted, so that the photo-alignment film 1 having an excellent alignment function can be obtained, and the reduction of the contrast ratio of the liquid crystal display device can be suppressed.

In addition, in the present embodiment, the polymer layer 10 and the metal nanoparticles 20 in which A1/A2 satisfies the relationship represented by the above formula 1 are used. In the present embodiment, an object is to disperse the metal nanoparticles 20 in the polymer layer 10 in which an ultraviolet light absorption amount is not sufficient when the polarized ultraviolet light irradiation is performed and sufficiently exert the alignment function of the photo-alignment film 1. Therefore, it is necessary to pay attention to a light absorption amount of the metal nanoparticles 20 to the polymer layer 10. Since the amount of light absorption is correlated with the absorbance, the present embodiment focuses on A1/A2. Hereinafter, the range of A1/A2 will be described in detail. As described above, since the absorbance of the polymer layer 10 and the absorbance of the metal nanoparticles 20 do not change before and after irradiation with polarized ultraviolet light, A1/A2 is the same (including substantially the same) before and after irradiation with polarized ultraviolet light.

In the present embodiment, the polymer layer 10 and the metal nanoparticles 20 in which A1/A2 is 0.2 or more are used. By adopting such an embodiment, in the alignment treatment step for the photo-alignment film 1, a ratio of the amount of polarized ultraviolet light absorbed by the metal nanoparticles 20 to the amount of polarized ultraviolet light absorbed by the polymer layer 10 increases, and the enhanced electric field 21 sufficiently acts on the polymer layer 10 near the metal nanoparticles 20. As a result, the alignment function of the photo-alignment film 1 can be sufficiently exerted while suppressing irradiation with the polarized ultraviolet light L, and the photo-alignment film 1 having an excellent alignment function can be obtained.

By increasing A1/A2, in the alignment treatment step for the photo-alignment film 1, the ratio of the amount of polarized ultraviolet light absorbed by the metal nanoparticles 20 to the amount of polarized ultraviolet light absorbed by the polymer layer 10 can be increased. Here, there is a correlation between the concentration of the metal nanoparticles 20 and the absorbance, and the absorbance of the metal nanoparticles 20 can be increased by increasing the concentration of the metal nanoparticles 20 in the photo-alignment film 1. Thus, as a first method of increasing A1/A2, a method of increasing the concentration of the metal nanoparticles 20 is considered. However, when the concentration of the metal nanoparticles 20 increases to a degree that A1/A2 exceeds 25, the concentration of the metal nanoparticles 20 dispersed in the polymer layer 10 becomes too high, so that particle aggregation occurs as described above, and the alignment function of the photo-alignment film cannot be sufficiently exerted. As a second method of increasing A1/A2, a method using the polymer layer 10 having a small absorbance is considered. However, in a photo-alignment film using the polymer layer 10 having a small absorbance that allows A1/A2 to exceed 25, the alignment function is not sufficient. On the other hand, in the present embodiment, by reducing A1/A2 to 25 or less, with the use of the polymer layer 10 having a larger absorbance, the photo-alignment film 1 can be formed while suppressing the occurrence of the aggregation of the metal nanoparticles 20, and the photo-alignment film 1 having an excellent alignment function can be obtained.

Here, in a case where while the concentration of the metal nanoparticles 20 is $10^9$ particles/(cm$^2$×100 nm) or more and $10^{19}$ particles/(cm$^2$×100 nm) or less, A1/A2 is less than 0.2, the absorbance of the metal nanoparticles 20 to the absorbance of the polymer layer 10 is small, and therefore, it is considered that an effect of improving the alignment function of the photo-alignment film obtained by dispersing the metal nanoparticles 20 is small. In the photo-alignment film in which, while the concentration of the metal nanoparticles 20 is $10^9$ particles/(cm$^2$×100 nm) or more and $10^{19}$ particles/ (cm$^2$×100 nm) or less, A1/A2 exceeds 25, since the absorbance of the polymer layer 10 itself is small, it is considered that the photo-alignment film does not have a sufficient alignment function. In a case where while A1/A2 is 0.2 or more and 25 or less, the concentration of the metal nanoparticles 20 is less than $10^9$ particles/(cm$^2$×100 nm), the range affected by the enhanced electric field 21 is narrow, and the electric field strength of the enhanced electric field 21 is weak. Therefore, it is considered that the enhanced electric field 21 cannot sufficiently act on the entire polymer layer 10, and the alignment function of the photo-alignment film cannot be sufficiently exerted. In a case where while A1/A2 is 0.2 or more and 25 or less, the concentration of the metal nanoparticles 20 exceeds $10^{19}$ particles/(cm²×100 nm), particle aggregation caused by an excessively high particle concentration of the metal nanoparticles 20 causes in-plane unevenness and a shift in resonance wavelength, so that the alignment function of the photo-alignment film cannot be sufficiently exerted.

Thus, in the present embodiment, when the concentration of the metal nanoparticles 20 in the photo-alignment film 1 is $10^9$ particles/(cm²×100 nm) or more and $10^{19}$ particles/(cm²×100 nm) or less, and A1/A2 is 0.2 or more and 25 or less, the alignment function of the photo-alignment film 1 can be sufficiently exerted while suppressing irradiation with the polarized ultraviolet light L in the alignment treatment step for the photo-alignment film 1, and the photo-alignment film 1 having an excellent alignment function can be obtained. For example, when the polymer layer 10 contains a photoreactive polymer in which an isomerization reaction occurs upon light irradiation, in Comparative embodiment 1, the polymer layer 10 not containing the metal nanoparticles 20 is irradiated with the polarized ultraviolet light L by several J/cm², so that a sufficient alignment function can be exerted in the photo-alignment film. On the other hand, in the present embodiment in which the metal nanoparticles 20 are dispersed in the polymer layer 10 containing the photoreactive polymer in which the isomerization reaction occurs upon light irradiation, the polarized ultraviolet light L having a lower irradiation amount than several J/cm² is irradiated, whereby the alignment function of the photo-alignment film 1 can be sufficiently exerted. Hereinafter, the photo-alignment film of the present embodiment will be described in more detail. In this specification, A1/A2 is also referred to as an absorbance ratio.

As shown in FIG. 1, the photo-alignment film 1 of the present embodiment has a structure in which the substrate 30 and the polymer layer 10 in which the metal nanoparticles 20 are dispersed are stacked. The photo-alignment film 1 is an alignment film obtained by forming a photo-alignment film material including a photoreactive polymer and the metal nanoparticles 20 on the substrate 30 and performing light irradiation (photo-alignment treatment) and has the function of aligning liquid crystal molecules in a specific direction.

When the polarized ultraviolet light L is applied to the polymer layer 10 in which the metal nanoparticles 20 are dispersed, the polarized ultraviolet light L is absorbed by the polymer layer 10 and the metal nanoparticles 20, respectively. Here, a light absorption coefficient of the metal nanoparticles 20 is many orders of magnitude higher than a light absorption coefficient of the polymer layer 10. In addition, after the enhanced electric field 21 is formed near the metal nanoparticles 20, the enhanced electric field 21 acts on the surrounding polymer layer 10, so that a structure of the photoreactive polymer contained in the polymer layer 10 near the metal nanoparticles 20 can be changed. Therefore, the alignment function of the photo-alignment film 1 can be dramatically improved.

The photoreactive polymer contained in the polymer layer 10 means any general material that, when irradiated with the polarized ultraviolet light L, undergoes a structural change to improve performance (alignment force) of controlling the alignment of the nearby liquid crystal molecules, or to change in the alignment force power and/or direction. In this specification, the ultraviolet light refers to an electromagnetic wave having a wavelength of 10 nm or more and 420 nm or less.

The polymer layer 10 preferably has an absorption peak in the wavelength region of 420 nm or less. By adopting such an embodiment, the polymer layer 10 can absorb the polarized ultraviolet light L, the polymer layer 10 can be subjected to an alignment treatment by ultraviolet light irradiation, and the photo-alignment film 1 can be produced. Since light having a wavelength of 220 nm or more affects alignability of the polymer layer 10, the polymer layer 10 preferably has an absorption peak in a wavelength region of 220 nm or more.

The absorption peak of the polymer layer 10 is a point where in an absorption spectrum (hereinafter, also referred to as the absorption spectrum of the polymer layer) where the absorbance of the polymer layer 10 is plotted with respect to wavelength, the absorbance has a maximum value. Here, although the metal nanoparticles 20 are dispersed in the polymer layer 10, the absorbance of the polymer layer 10 is an absorbance excluding an influence of the absorption by the metal nanoparticles 20. The absorption spectrum of the polymer layer 10 is an absorption spectrum excluding the influence of absorption by the metal nanoparticles 20. The absorption peak of the polymer layer 10 is an absorption peak excluding the influence of absorption by the metal nanoparticles 20. When the material (component) of the polymer layer 10 is known, the absorption spectrum of the polymer layer 10 can be measured as follows. That is, the material of the polymer layer 10 before the metal nanoparticles 20 are dispersed is formed into a film so as to have the thickness of the polymer layer 10 in the photo-alignment film 1, and then the absorbance is measured for each wavelength, whereby the absorption spectrum of the polymer layer 10 can be measured. Even when the material (component) of the polymer layer 10 is not known, the absorption spectrum of the polymer layer 10 can be measured by the following method. That is, first, the photo-alignment film 1 is dissolved in a predetermined solvent, and the components of the polymer layer 10 and the metal nanoparticles 20 are separated by using centrifugation or the like. The separated components of the polymer layer 10 are formed into a film so as to have the thickness of the polymer layer 10 in the photo-alignment film 1, and then the absorbance is measured for each wavelength, whereby the absorption spectrum of the polymer layer 10 can be measured. The absorbance can be measured, for example, using an ultraviolet-visible spectrophotometer (UV2450, manufactured by Shimadzu Corporation). The components of the polymer layer 10 are specified using elemental analysis or the like, and after a film having the same composition and thickness as the polymer layer 10 is formed, the absorbance is measured for each wavelength, whereby the absorption spectrum of the film may be taken as the absorption spectrum of the polymer layer 10. In this specification, the absorbance is determined by the following formula A:

$$\text{Absorbance} = -\log(I/I_0) \quad \text{(Formula A)}$$

(where I represents transmitted light intensity, and $I_0$ represents incident light intensity).

The thickness of the polymer layer 10 is not limited, but is, for example, 100 nm. Here, when the thickness of the polymer layer 10 is less than 50 nm, irregularities due to the metal nanoparticles 20 appear on the surface of the polymer layer 10 due to the polymer layer 10 being too thin, which may cause disorder in the alignment of liquid crystal molecules. When the thickness of the polymer layer 10 exceeds 150 nm, resistance of the polymer layer 10 increases due to the polymer layer 10 being too thick, which may cause a V-T high voltage shift. Thus, the film thickness of the polymer layer 10 is preferably 50 nm or more and 150 nm or less, more preferably 75 nm or more and 125 nm or less. Here, the V-T high voltage shift refers to a phenomenon in which V-T characteristics shift to a high voltage side, that is, a voltage-transmittance curve shifts toward a higher voltage. In other words, the V-T high voltage shift means that the voltage threshold increases.

The photoreactive polymer contains a photoreactive group. The photoreactive group is preferably a group that undergoes a structural change due to isomerization upon irradiation with the polarized ultraviolet light L, a group that undergoes a structural change that undergoes dimerization, a group that undergoes a structural change due to decomposition, or a group that undergoes a structural change due to dimerization or isomerization. The number of types of the photoreactive polymer contained in the polymer layer 10 may be one or plural. When a plurality of types of photoreactive polymers are contained in the polymer layer 10, it is preferable that the wavelengths of the absorption peaks of the plurality of types of photoreactive polymers be close to each other. When the polymer layer 10 contains a plurality of types of photoreactive polymers, for example, if the wavelength of the absorption peak of a certain photoreactive polymer is 254 nm, the wavelength of the absorption peak of another photoreactive polymer is preferably close to 254 nm. Further, if the wavelength of the absorption peak of a certain photoreactive polymer is 313 nm, the wavelength of the absorption peak of another photoreactive polymer is preferably close to 313 nm. Furthermore, if the wavelength of the absorption peak of a certain photoreactive polymer is 365 nm, the wavelength of the absorption peak of another photoreactive polymer is preferably close to 365 nm By adopting such an embodiment, it is possible to further improve the alignment function. Here, the absorption peak of the photoreactive polymer is the absorption peak of the polymer layer 10 composed of the photoreactive polymer.

Specific examples of photoisomerizable photoreactive groups in which isomerization occurs upon irradiation with the polarized ultraviolet light L include an azobenzene group (azobenzene). Specific examples of photodecomposable photoreactive groups that undergo decomposition upon irradiation with the polarized ultraviolet light L include a cyclobutane ring group (dianhydride containing a cyclobutane ring such as 1,2,3,4-cyclobutanetetracarboxylic acid-1,2:3,4-dianhydride (CBDA)). Specific examples of photoreactive groups that are a mixture of photodimerization and photoisomerization in which dimerization or isomerization occurs upon irradiation with the polarized ultraviolet light L include a cinnamate group, a chalcone group, a coumarin group, and a stilbene group (cinnamate, cinnamoyl, 4-chalcone, coumarin, stilbene).

The photoreactive polymer is not limited as long as it is a photoreactive polymer contained in a known photo-alignment film. Even if any photoreactive polymer is used, a photo-alignment film having an excellent alignment function can be obtained by containing the metal nanoparticles, and the contrast ratio of a liquid crystal display device including the photo-alignment film can be improved. The photoreactive group of the photoreactive polymer contained in the above-described known photo-alignment film may be any of a decomposition type, a dimerization type and an isomerization type.

Examples of the photoreactive polymer include a polymer having a photoreactive group (photosensitive structure). When a polymer having a photoreactive group is irradiated with polarized light, the photoreactive group in the irradiated portion is isomerized or cross-linked, so that the photoreactive polymer is aligned, and the alignment force is given to a film made of the photoreactive polymer. Examples of the structure of the photoreactive group include an azobenzene structure, a maleimide structure, a chalcone structure, a cinnamic acid structure, a 1,2-vinylene structure, a 1,2-acetylene structure, a spiropyran structure, a spirobenzopyrane structure, and a fulgide structure. The photoreactive polymer forming a photo-alignment film may be one kind, a combination of a plurality of polymers having different structures, or a copolymer having a plurality of different photoreactive groups. The photoreactive polymer can be obtained by polycondensation such as dehydration and dealcoholization, chain polymerization such as radical polymerization, anion polymerization and cation polymerization, coordination polymerization, ring-opening polymerization or the like, of a monomer having a photoreactive group. Examples of the photoreactive polymer include photoreactive polymers described in Japanese Patent Nos. 4450261 and 4011652, JP-A-2010-49230, Japanese Patent No. 4404090, JP-A-2007-156439, JP-A-2007-232934, and the like. Among them, as the photoreactive polymer, a polymer forming crosslinked structure by polarized light irradiation is preferred, from the viewpoint of durability.

The metal nanoparticles 20 are particles having a particle size of 5 nm or more and 80 nm or less and containing a metal. Here, the particle size of the metal nanoparticles 20 is a mode value of a particle size distribution calculated on the number basis when an aqueous solution of the metal nanoparticles 20 having a particle concentration of $10^8$ particles/ml or less is measured by a dynamic light scattering method (DLS). In the measurement by DLS, a laser beam is applied to the aqueous solution of the metal nanoparticles 20, information such as the scattering intensity and direction of the particles is analyzed, and the particle size distribution is calculated.

The metal nanoparticles 20 preferably have a particle size of 5 nm or more. The enhanced electric field 21 formed by the energy of the polarized ultraviolet light L absorbed by the metal nanoparticles 20 is formed in a direction 21A parallel to the polarization direction L1 of the polarized ultraviolet light L with respect to the metal nanoparticle 20, as shown in FIG. 4, and is formed on one side and the other side of the metal nanoparticle 20 while having on each side a spread 21B about the diameter of the metal nanoparticle 20. Thus, when the particle size of the metal nanoparticles 20 is 5 nm or more, the enhanced electric field 21 can sufficiently act on the polymer layer 10 near the metal nanoparticles 20 in the alignment treatment step for the photo-alignment film 1. As a result, the alignment function of the photo-alignment film 1 can be more sufficiently exerted while suppressing the irradiation amount of the polarized ultraviolet light L, and the photo-alignment film 1 can have a more excellent alignment function. The metal nanoparticles 20 more preferably have a particle size of 20 nm or more.

The particle size of the metal nanoparticles 20 is preferably equal to or less than the film thickness of the polymer layer 10. By adopting such an embodiment, since the metal nanoparticles 20 can be prevented from being exposed from the surface of the polymer layer 10, flatness of the photo-alignment film 1 can be improved. When the film thickness of the polymer layer 10 is 100 nm or more, the metal nanoparticles 20 preferably have a particle size of 100 nm or less, more preferably 60 nm or less.

The metal nanoparticles 20 have an absorption peak in the wavelength region of 420 nm or less. By adopting such an embodiment, the metal nanoparticles 20 can absorb the polarized ultraviolet light L, the alignment function of the photo-alignment film 1 can be further exerted by the irradiation with the polarized ultraviolet light L in the alignment treatment step for the photo-alignment film 1. The metal nanoparticles 20 have, for example, an absorption peak in a wavelength region of 200 nm or more.

The metal nanoparticles 20 preferably have an absorption peak in the wavelength region of 300 nm or less. By adopting such an embodiment, absorption of visible light by the metal nanoparticles 20 can be suppressed, so that coloring of the photo-alignment film 1 in a visible region can be suppressed.

The absorption peak of the metal nanoparticles 20 is a point where in an absorption spectrum (hereinafter, also referred to as the absorption spectrum of the metal nanoparticles) where the absorbance of the metal nanoparticles 20 is plotted with respect to wavelength, the absorbance has a maximum value. Here, although the metal nanoparticles 20 are dispersed in the polymer layer 10, the absorbance of the metal nanoparticles 20 is an absorbance excluding an influence of the absorption by the polymer layer 10. The absorption spectrum of the metal nanoparticles 20 is an absorption spectrum excluding the influence of absorption by the polymer layer 10. The absorption peak of the metal nanoparticles 20 is an absorption peak excluding the influence of absorption by the polymer layer 10. When the material (component) of the metal nanoparticles 20 is known, the absorption spectrum of the metal nanoparticles 20 can be measured as follows. That is, the metal nanoparticles 20 before being dispersed in the polymer layer 10 are dispersed in water so as to have the same concentration as the metal nanoparticles 20 in the photo-alignment film 1, and then put in a cell for measuring the absorbance (bottom surface: 1 cm×1 cm, height: 5 cm), and the absorbance is measured for each wavelength, so that the absorption spectrum of the metal nanoparticles 20 can be measured. Even when the material (component) of the metal nanoparticles 20 is not known, the absorption spectrum of the metal nanoparticles 20 can be measured by the following method. That is, the photo-alignment film 1 is dissolved in a predetermined solvent, and the components of the polymer layer 10 and the metal nanoparticles 20 are separated by using centrifugation or the like. The separated metal nanoparticles 20 are dispersed in water so as to have the same concentration as the metal nanoparticles 20 in the photo-alignment film 1, and then put in the cell for measuring the absorbance, and the absorbance is measured for each wavelength, so that the absorption spectrum of the metal nanoparticles 20 can be measured. The components of the metal nanoparticles 20 are specified using elemental analysis or the like, and after particles having the same composition and particle size as the metal nanoparticles 20 are produced, the absorbance is measured for each wavelength, whereby the absorption spectrum of the particles may be taken as the absorption spectrum of the metal nanoparticles 20.

In the above description, the method of separating the components of the polymer layer 10 and the metal nanoparticles 20 from the photo-alignment film 1 and measuring the absorption spectrum has been described. However, since the absorption spectrum of the photo-alignment film 1 is the sum of the absorption spectrum of the polymer layer 10 and the absorption spectrum of the metal nanoparticles 20, the absorption spectrum of the photo-alignment film 1 and the absorption spectrum of the metal nanoparticles 20 are each measured, and the absorption spectrum of the metal nanoparticles 20 is subtracted from the absorption spectrum of the photo-alignment film 1, whereby the absorption spectrum of the polymer layer 10 can be obtained.

The metal nanoparticles 20 include a metal. The metal nanoparticles 20 preferably contain at least one substance selected from the group consisting of silver, aluminum, indium, and alloys thereof. The metal nanoparticles 20 as described above are preferably used because they have an absorption peak in a wavelength region of 420 nm or less.

The metal nanoparticles 20 may each be a particle composed of one kind of substance, and may be a core-shell type particle which includes a core portion and a shell portion and in which the core portion and the shell portion are composed of different kinds of substances. Examples of the core-shell type particles include particles in which the core portion is made of silver and the shell portion is made of indium. Further examples of the core-shell type particles include particles in which the core portion is silica or titanium oxide ($TiO_2$) and the shell portion is formed of aluminum or indium. Although these particles have an absorption peak on each of a short wavelength side (wavelength region of 400 nm or less) and a long wavelength side (long wavelength region of 700 nm or more), absorption on the short wavelength side is used in the present embodiment, so that the alignment function of the photo-alignment film 1 can be sufficiently exerted while suppressing irradiation with the polarized ultraviolet light.

It is preferable that the absorbance A1 and the absorbance A2 satisfy a relationship represented by the following formula 2. By adopting such an embodiment, in the alignment treatment step for the photo-alignment film 1, the ratio of the amount of polarized ultraviolet light absorbed by the metal nanoparticles 20 to the amount of polarized ultraviolet light absorbed by the polymer layer 10 further increases, and the enhanced electric field 21 more sufficiently acts on the polymer layer 10 near the metal nanoparticles 20. Therefore, the alignment function of the photo-alignment film 1 can be more sufficiently improved while suppressing while suppressing irradiation with the polarized ultraviolet light L.

$$1 \leq A1/A2 \qquad \text{(Formula 2)}$$

It is preferable that the absorbance A1 and the absorbance A2 satisfy a relationship represented by the following formula 3. By adopting such an embodiment, the alignment function of the photo-alignment film 1 can be sufficiently exerted while further suppressing the irradiation amount of the polarized ultraviolet light to the photo-alignment film 1.

$$A1/A2 \leq 23 \qquad \text{(Formula 3)}$$

The absorbance of the metal nanoparticles 20 can be adjusted by changing the concentration, absorption wavelength, material, shape, and the like of the metal nanoparticles 20.

The absorbance A1 is an absorbance at an absorption peak that the metal nanoparticles 20 have in the wavelength region of 420 nm or less (preferably the wavelength region of 200 nm or more and 420 nm or less). When the metal nanoparticles 20 have a plurality of absorption peaks in the wavelength region of 420 nm or less (preferably the wavelength region of 200 nm or more and 420 nm or less), the absorbance of the absorption peak having the largest absorbance in the wavelength region of 200 nm or more and 420 nm or less is defined as the absorbance A1.

The absorbance A2 is an absorbance at an absorption peak that the polymer layer 10 has in the wavelength region of 420 nm or less (preferably the wavelength region of 200 nm or more and 420 nm or less). When the polymer layer 10 has a plurality of absorption peaks in the wavelength region of 420 nm or less (preferably the wavelength region of 200 nm or more and 420 nm or less), the absorbance of the absorption peak having the largest absorbance in the wavelength region of 200 nm or more and 420 nm or less is defined as the absorbance A2.

A difference between a wavelength at which the polymer layer 10 has an absorption peak (also referred to as the absorption wavelength of the polymer layer) and a wavelength at which the metal nanoparticles 20 have an absorption peak (also referred to as the absorption wavelength of the metal nanoparticles) is preferably less than 30 nm. By adopting such an embodiment, in the alignment treatment step for the photo-alignment film 1, it becomes possible to allow the metal nanoparticles 20 to efficiently absorb the polarized ultraviolet light L irradiated according to the absorption wavelength of the polymer layer 10, and the alignment function of the photo-alignment film 1 can be more sufficiently improved. The above difference is an absolute value of the difference between the wavelength at which the polymer layer 10 has an absorption peak and the wavelength at which the metal nanoparticles 20 have an absorption peak.

The photo-alignment film 1 preferably contains the metal nanoparticles 20 in an amount of $10^{9.4}$ particles/(cm$^2$×100 nm) or more and $10^{18.6}$ particles/(cm$^2$×100 nm) or less, more preferably $10^{9.7}$ particles/(cm$^2$×100 nm) or more and $10^{18.3}$ particles/(cm$^2$×100 nm) or less, still more preferably $10^{9.9}$ particles/(cm$^2$×100 nm) or more and $10^{18.1}$ particles/(cm$^2$× 100 nm) or less, particularly preferably $10^{10}$ particles/(cm$^2$× 100 nm) or more and $10^{18}$ particles/(cm$^2$×100 nm) or less. The photo-alignment film 1 preferably contains the metal nanoparticles 20 in an amount of $10^{14}$ particles/(cm$^2$×100 nm) or more, more preferably $10^{14.4}$ particles/(cm$^2$×100 nm) or more, still more preferably $10^{14.7}$ particles/(cm$^2$×100 nm) or more, even more preferably $10^{14.8}$ particles/(cm$^2$×100 nm) or more, particularly preferably $10^{15}$ particles/(cm$^2$× 100 nm) or more.

Figure 5:
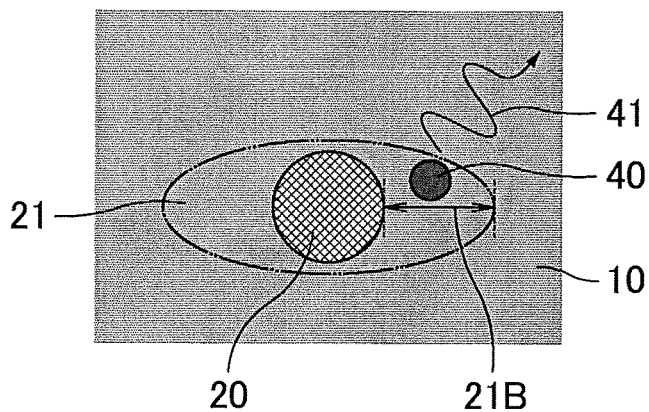
FIG. 5 is a schematic view illustrating a phosphor included in the photo-alignment film of Embodiment 1.

FIG. 5 is a schematic view illustrating a phosphor included in the photo-alignment film of Embodiment 1. As shown in FIG. 5, the photo-alignment film 1 of the present embodiment preferably includes a phosphor 40 as an example of the light emitting body in the polymer layer 10. In the present embodiment, since the metal nanoparticles 20 have an absorption peak in the wavelength region of 420 nm or less, for example, only red and green lights pass through the photo-alignment film 1. As a result, the photo-alignment film 1 may be tinted yellowish. However, by introducing the phosphor 40 into the photo-alignment film 1, for example, the enhanced electric field 21 formed near the metal nanoparticles 20 by external light acts on the phosphor 40, so that blue fluorescence 41 can be emitted from the phosphor 40. As a result, an achromatic color light can be emitted by a blue fluorescent color and red and green transmitted colors, and coloring of the photo-alignment film 1 can be suppressed.

In order for the enhanced electric field 21 formed near the metal nanoparticles 20 to act on the phosphor 40, it is preferable that the phosphor 40 be contained in the enhanced electric field 21 formed by the metal nanoparticles 20 in a large amount. The phosphor 40 is preferably included in a coating film that covers the metal nanoparticles 20, for example. By adopting such an embodiment, the phosphor can be disposed in the enhanced electric field 21 formed by the metal nanoparticles 20, and the enhanced electric field 21 can act on the phosphor 40. As a result, coloring of the photo-alignment film 1 can be further suppressed. The thickness of the coating film is preferably in a range where the enhanced electric field 21 reaches more strongly, that is, about half of the diameter of the metal nanoparticles 20, for example, preferably 5 nm or more and 20 nm or less. The coating film contains, for example, silica. For example, when the diameter of the metal nanoparticles 20 is 40 nm, the thickness of the coating film containing silica is preferably 20 nm. In this case, the diameter of the metal nanoparticles 20 including the coating film is 40 nm+20 nm×2=80 nm. For example, if the thickness of the polymer layer 10 is 100 nm, the diameter of the metal nanoparticles 20 including the coating film is less than the thickness of the polymer layer 10, and flatness of the photo-alignment film 1 can be improved.

The phosphor 40 is a substance capable of absorbing external excitation light and emitting light. The phosphor 40 preferably has an absorption peak in a wavelength region of 300 nm or more and 400 nm or less. By adopting such an embodiment, the phosphor 40 can absorb the energy from the enhanced electric field 21 formed by the energy absorbed by the metal nanoparticles 20. The phosphor 40 preferably has an emission peak in a wavelength region of more than 400 nm and 450 nm or less. By adopting such an embodiment, the phosphor 40 can emit blue light, and an achromatic color light can be emitted by the blue fluorescent color, and red and green transmitted colors transmitted through the photo-alignment film 1. Specific examples of the phosphor 40 as described above include a phosphor such as Alexa Fluor 405 (registered trademark) (manufactured by Thermo Fisher Scientific). Here, the emission peak in this specification means a point where in a fluorescence spectrum where fluorescence intensity is plotted with respect to wavelength, the fluorescence intensity has a maximum value. The expression that having an emission peak in a specific wavelength region means that the wavelength at the emission peak exists in the specific wavelength region. The fluorescence spectrum of the metal nanoparticles 20 (hereinafter, also referred to as phosphor-supported metal nanoparticles) covered with the coating film containing the phosphor 40 can be measured as follows. That is, the phosphor-supported metal nanoparticles before being dispersed in the polymer layer 10 are dispersed in water so as to have the same concentration as the concentration of the phosphor-supported metal nanoparticles in the photo-alignment film 1. Then, excitation light with a wavelength according to the wavelength of the absorption peak of the phosphor 40 is applied to an aqueous solution of the phosphor-supported metal nanoparticles, the excitation light is cut by a sharp cut filter on a detection side, and only a fluorescent component from the aqueous solution of the phosphor-supported metal nanoparticles is detected, so that the fluorescence spectrum can be measured.

The substrate 30 is a substrate having an insulating property, and examples thereof include transparent substrates such as a plastic substrate.

Next, a production method for the photo-alignment film 1 of the present embodiment is described. The method for producing the photo-alignment film 1 according to the present embodiment includes polymer layer forming of applying onto a substrate a photo-alignment film material containing a photoreactive polymer and the metal nanoparticles 20 having an absorption peak in a wavelength region of 420 nm or less to form the polymer layer 10 in which the metal nanoparticles 20 are dispersed at a concentration of $10^9$ particles/(cm$^2$×100 nm) or more and $10^{19}$ particles/ (cm$^2$×100 nm) or less, ultraviolet light irradiation of applying polarized ultraviolet light to the polymer layer 10, and a post-baking step of performing post-baking on the polymer layer 10. In this method, an absorbance A1 at the absorption peak of the metal nanoparticles 20 and an absorbance A2 at an absorption peak of the polymer layer 10 satisfy a relationship represented by the following formula 1:

$$0.2 \leq A1/A2 \leq 25 \quad \text{(Formula 1)}$$

The photoreactive polymer according to the present embodiment can be dissolved in a solvent to form a photo-alignment film material. Examples of a solvent used for the photo-alignment film material include N-methylpyrrolidone (NMP), butyl cellosolve, and butyl cellosolve acetate. These solvents may be used in combination of two or more.

A content of the photoreactive polymer with respect to the photo-alignment film material is preferably 5% by weight or more and 15% by weight or less, more preferably 7.5% by weight or more and 12.5% by weight or less, still more preferably 8.5% by weight or more and 11.5% by weight or less. A content of the solvent in the photo-alignment film material is not limited as long as the photoreactive polymer dissolves, but the content of the solvent is usually, for example, 85% by weight or more and 95% by weight or less based on the total weight of the photoreactive polymer.

As a method of applying the photo-alignment film material in the polymer layer forming, any method generally known in the relevant field may be used. For example, the method includes a spin coating method, a bar coating method, a die coater method, a screen printing method, and a spray coater method.

In the ultraviolet light irradiation, the polymer layer 10 is irradiated with polarized ultraviolet light (linearly polarized ultraviolet light), a polarization axis of the polarized ultraviolet light is selectively reacted (dimerization, isomerization, etc.) with the photoreactive group in the photoreactive polymer, and the alignment function is given to the polymer layer 10. Although the polarized ultraviolet light can be applied from any of the vertical direction and the oblique direction with respect to the polymer layer 10, it is usually preferable to apply the polarized ultraviolet light from the vertical direction.

In the present embodiment, the linearly polarized light is light in which as for a face including a vibration direction of an electric field (or magnetic field), a specific surface is specified. The linearly polarized light can be obtained by using a polarizing filter or a polarizing prism for light from a light source.

Examples of the light source include a xenon lamp, a high-pressure mercury lamp, an extra-high-pressure mercury lamp, and a metal halide lamp. By using an interference filter, a color filter, or the like with respect to ultraviolet light obtained from the light source, the wavelength range of the irradiation may be restricted.

In the production method for the photo-alignment film 1, in the polymer layer forming, the photo-alignment film material is applied onto the substrate so as to satisfy the relationship represented by the above formula 1, so that the alignment function of the photo-alignment film 1 can be sufficiently improved while suppressing the irradiation amount of the polarized ultraviolet light to be irradiated in the ultraviolet light irradiation. The irradiation amount of the polarized ultraviolet light in the ultraviolet light irradiation varies depending on the type of the photoreactive polymer, the coating amount and the like, but is, for example, 1 mJ/cm$^2$ or more and 500 mJ/cm$^2$ or less. When a photomask is used in the irradiation with polarized ultraviolet light, the alignment function can be provided in a pattern shape in two or more different directions. Specifically, after the photo-alignment film material is applied onto the substrate, a photomask is covered thereon and irradiated with polarized ultraviolet light, and thus to impart the alignment function to only an exposed portion. By repeating this process while changing directions, as necessary, the alignment function can be provided in a pattern shape in multiple directions.

In the production method for the photo-alignment film 1, by performing the post-baking step, a side chain portion of the photoreactive polymer that has not undergone photoreaction can be aligned in a certain direction. The conditions of the post-baking step may be any condition sufficient for allowing the alignment to proceed. For example, the temperature is preferably 150° C. or more and 300° C. or less, more preferably 200° C. or more and 250° C. or less.

Embodiment 2

Thus, in the present embodiment, features peculiar to this embodiment will be mainly described, and description overlapping with the above embodiment will be omitted. In the present embodiment, a retardation substrate including the photo-alignment film 1 of Embodiment 1 will be described.

Figure 6:
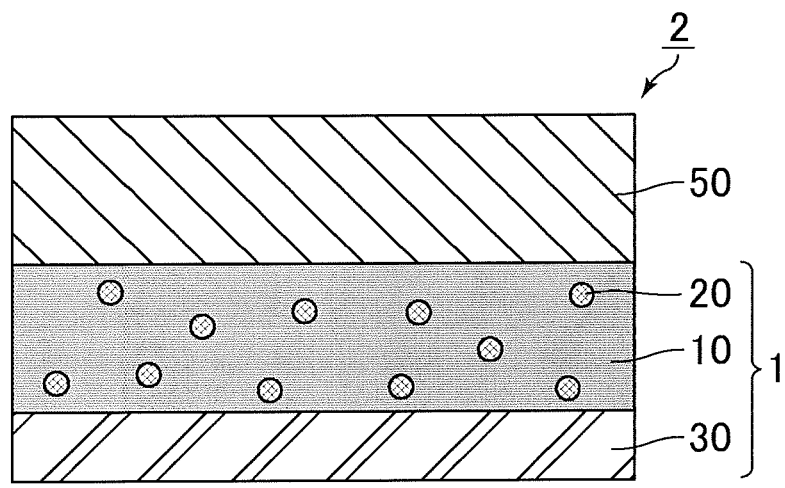
FIG. 6 is a schematic cross-sectional view of a retardation substrate of Embodiment 2.

FIG. 6 is a schematic cross-sectional view of a retardation substrate of Embodiment 2. As shown in FIG. 6, a retardation substrate 2 of the present embodiment includes the photo-alignment film 1 and a retardation layer 50 provided on the photo-alignment film 1 and containing a polymer having a mesogen group and a reactive group. Since the photo-alignment film 1 has a sufficiently enhanced alignment function and has an excellent alignment function, the mesogen groups contained in the retardation layer 50 provided on the photo-alignment film 1 can be aligned in a specific direction, and the contrast ratio of the retardation substrate 2 can be increased. Here, the contrast ratio of the retardation substrate 2 is obtained by dividing luminance of a retardation substrate sandwiched between parallel nicol polarizing plates by luminance of a retardation substrate sandwiched between crossed nicol polarizing plates. The luminance can be obtained using a luminance meter SR-UL1 (manufactured by TOPCON CORPORATION).

The retardation layer 50 is obtained by forming a retardation layer forming material, containing a compound having a mesogen group and a reactive group and a solvent, into a film on the photo-alignment film 1. The compound having a mesogen group and a reactive group is preferably a reactive liquid crystal compound (reactive mesogen (RM)), more preferably a polymerizable liquid crystal compound. Here, the reactive liquid crystal compound is a liquid crystal compound whose alignment is fixed by light, heat, and electron beam irradiation, and the polymerizable liquid crystal compound is a liquid crystal compound which is polymerized by light, heat, and electron beam irradiation such that the alignment is fixed. The polymerizable liquid crystal compound may be polymerized by applying heat energy, but is preferably a compound polymerized by light irradiation. The retardation layer 50 contains the unreacted mesogen group and the reactive group.

As the polymerizable liquid crystal compound, a polymerizable liquid crystal monomer, a polymerizable liquid crystal oligomer or a polymerizable liquid crystal polymer can be used, and these can be mixed with each other and used.

As the polymerizable liquid crystal compound, a polymerizable liquid crystal monomer is suitably used because the polymerizable liquid crystal monomer has high sensitivity at the time of alignment and can be easily aligned at a desired angle (in a desired direction).

The solvent may be any solvent capable of dissolving the compound, and one kind or two or more kinds of solvents can be used. As the solvent, one solvent such as Propylene Glycol Monomethyl Ether Acetate (PGMEA), cyclopentanone, or Methyl IsoButyl Ketone (MIBK), or a mixture of two or more solvents is preferably used.

The retardation layer forming material may contain a polymerization initiator or an alignment control agent in addition to the compound and the solvent described above.

When a polymerizable liquid crystal compound is polymerized by electron beam irradiation, a polymerization initiator may not be necessary in some cases. However, when polymerization is performed by, for example, generally known ultraviolet (UV) irradiation, the polymerization initiator is usually used to promote polymerization.

The alignment controlling agent is a compound that affects an alignment state of the above compound and the like in the retardation layer 50, and for example, a compound having a 1,3,5-triazine ring is used.

Embodiment 3

Thus, in the present embodiment, features peculiar to this embodiment will be mainly described, and description overlapping with the above embodiment will be omitted. In the present embodiment, a liquid crystal display device including the photo-alignment film 1 of Embodiment 1 will be described.

Figure 7:
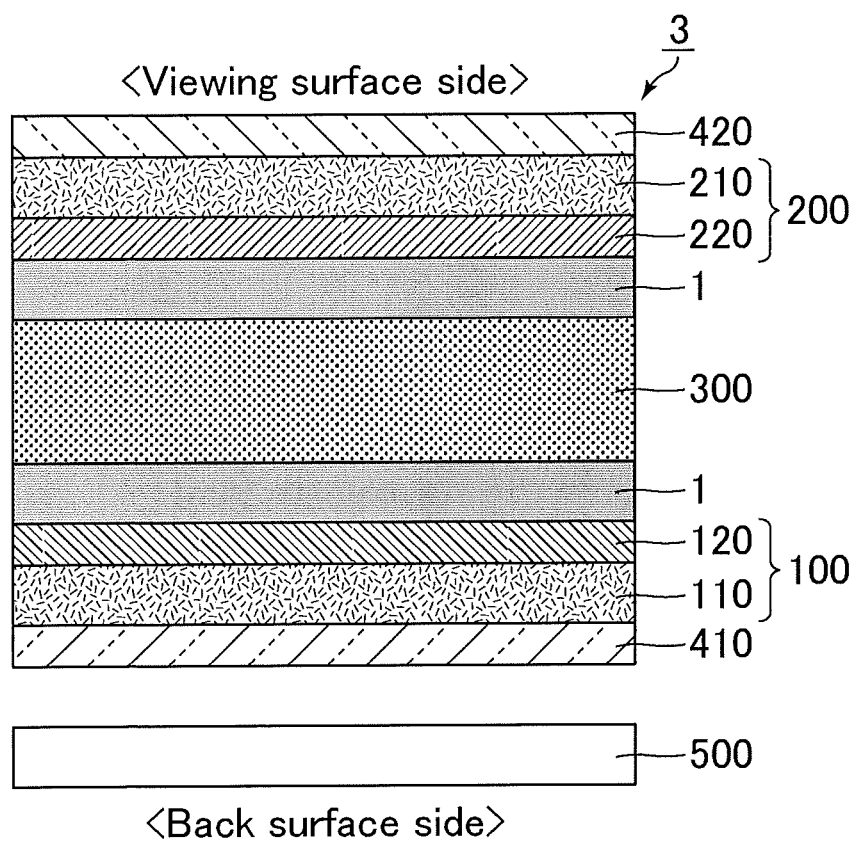
FIG. 7 is a schematic cross-sectional view of a liquid crystal display device of Embodiment 3.

FIG. 7 is a schematic cross-sectional view of the liquid crystal display device of Embodiment 3. As shown in FIG. 7, a liquid crystal display device 3 of the present embodiment includes a backlight 500, a first polarizing plate 410, a first substrate 100, the photo-alignment film 1, a liquid crystal layer 300, the photo-alignment film 1, a second substrate 200, and a second polarizing plate 420 in the stated order from the back surface side to the viewing surface side. Since the photo-alignment film 1 of the present embodiment includes the metal nanoparticles 20, in the alignment treatment step for the photo-alignment film 1, the alignment function can be sufficiently exerted while shortening an irradiation time of the polarized ultraviolet light compared to a photo-alignment film not including the metal nanoparticles 20. As, a result, load on the manufacturing process of the liquid crystal display device 3 can be reduced. Since the alignment function of the photo-alignment film 1 is sufficiently enhanced, liquid crystal molecules included in the liquid crystal layer 300 provided on the photo-alignment film 1 can be aligned in a specific direction, and the contrast ratio and chromaticity of the liquid crystal display device 3 can be increased.

The first substrate 100 has an insulating substrate 110 and an electrode layer 120 in the stated order from the back surface side to the viewing surface side. The second substrate 200 includes an insulating substrate 210 and a color filter layer 220 in the stated order from the viewing surface side to the back surface side.

The insulating substrates 110 and 210 are, for example, insulating substrates such as a glass substrate and a plastic substrate.

The electrode layer 120 includes a pixel electrode and a common electrode. Examples of the structures of the pixel electrode and the common electrode include a Fringe Field Switching (FFS) mode electrode structure included in an FFS mode liquid crystal display device and an In-Plane Switching (IPS) mode electrode structure included in an IPS more liquid crystal display device. One of the pixel electrode and the common electrode having the FFS mode electrode structure is planar, the other electrode is provided with a slit, and the other electrode is disposed on the liquid crystal layer 300 side of one electrode with an insulating film interposed therebetween so as to face one electrode. One and the other of the pixel electrode and the common electrode having the IPS mode electrode structure are comb-shaped electrodes, and are arranged such that the comb teeth fit each other.

The first substrate 100 further includes, on the insulating substrate 110, a plurality of gate lines extending in parallel with each other, and a plurality of source lines extending in parallel with each other in a direction intersecting each gate line via an insulating film. The plurality of gate lines and the plurality of source lines are formed in a lattice shape as a whole so as to partition each pixel. For example, a thin-film transistor (TFT) is disposed as a switching element at an intersection of each source line and each gate line. The pixel electrode is disposed in each region surrounded by two adjacent source lines and two adjacent gate lines, and, for example, the pixel electrode is electrically connected to the corresponding source line via a semiconductor layer included in the TFT.

The common electrode is an electrode formed over the entire display region regardless of pixel boundaries. A common signal kept at a constant value is supplied to the common electrode, and the common electrode is kept at a constant potential.

The liquid crystal display device 3 further includes a source driver electrically connected to the source line, a gate driver electrically connected to the gate line, and a controller. The gate driver sequentially supplies a scanning signal to the gate line under the control of the controller. The source driver supplies a data signal to the source line under the control of the controller at a timing when the TFT is brought into a voltage applied state by the scanning signal. The pixel electrodes are each set to a potential according to the data signal supplied through the corresponding TFT. When the pixel electrode and the common electrode has the FFS mode electrode structure, a fringe electric field is generated between the pixel electrode and the common electrode, and the liquid crystal molecules of the liquid crystal layer 300 rotate. In this manner, the magnitude of a voltage applied between the pixel electrode and the common electrode is controlled, retardation of the liquid crystal layer is changed, and transmission and non-transmission of light are controlled. As a result, gray display or white display is performed in the voltage applied state, and black display is performed in a voltage non-applied state. The voltage applied state is a state where a voltage is applied between the pixel electrode and the common electrode, and the voltage non-applied state is a state where no voltage is applied between the pixel electrode and the common electrode.

As the color filter layer 220 included in the second substrate 200, a color filter layer generally used in the field of a liquid crystal display device can be used. For example, the color filter layer 220 includes a black matrix provided in a lattice shape so as to correspond to the gate line and the source line and color filters of a plurality of colors including a red layer, a green layer, and a blue layer provided so as to be periodically arranged between lattices of the black matrix.

The liquid crystal layer 300 contains liquid crystal molecules horizontally aligned with the first substrate 100 and the second substrate 200. The liquid crystal display device 3 of the present embodiment controls a quantity of transmitting light by applying voltage to the liquid crystal layer 300 and changing an alignment state of liquid crystal molecules according to the applied voltage.

Here, the expression that the liquid crystal molecules are horizontally aligned with the first substrate 100 and the second substrate 200 means that a tilt angle (including a pretilt angle) of the liquid crystal molecules is 0° to 5° with respect to the surfaces of the first substrate 100 and the second substrate 200, preferably 0° to 3°, more preferably 0° to 1°. The tilt angle of the liquid crystal molecules means an angle at which the major axis (optical axis) of the liquid crystal molecules is inclined with respect to the surfaces of the first polarizing plate 410 and the second polarizing plate 420.

The first polarizing plate 410 and the second polarizing plate 420 are both absorptive polarizers and disposed in the crossed nicol with their absorption axes perpendicular to each other. As the first polarizing plate 410 and the second polarizing plate 420, polarizers (absorptive polarizing plates) obtained by dyeing and adsorbing an anisotropic material such as iodine complex (or dye) on a polyvinyl alcohol (PVA) film and then stretching and aligning the film can be used, for example.

As the backlight 500, those generally used in the field of liquid crystal display device may be used. The backlight 500 is provided on the opposite side of the first polarizing plate 410 from the liquid crystal layer 300, and may be a direct type or an edge light type. A light source of the backlight 500 may be of any type such as light emitting diodes (LEDs) or cold cathode fluorescent lamps (CCFLs).

(Modification of Embodiment 3)

In Embodiment 3, the mode in which the pixel electrode and the common electrode are arranged on the electrode layer 120 has been described. However, the electrode layer 120 may have only one of the pixel electrode and the common electrode, and in this case, the other electrode is disposed on the second substrate 200. As described above, as a liquid crystal display device in which one of the pixel electrode and the common electrode is disposed on the first substrate 100 and the other electrode is disposed on the second substrate 200, a VA (Vertical Alignment) mode liquid crystal display device and a TN (Twisted Nematic) mode liquid crystal display devices are exemplified.

In the liquid crystal layer 300 included in the VA mode liquid crystal display device, in the voltage non-applied state, the liquid crystal molecules are aligned substantially perpendicular to the main surfaces of the first substrate 100 and the second substrate 200. In the liquid crystal layer 300 included in the TN mode liquid crystal display device, in the voltage non-applied state, the liquid crystal molecules are aligned so as to be twisted 90 degrees while rotating in one direction from the pixel electrode side toward the common electrode side.

The present invention is described below in more detail based on examples. The examples, however, are not intended to limit the scope of the present invention.

Example 1

In Example 1, the retardation substrate of Embodiment 2 was produced. In Example 1, core-shell particles composed of an alloy of indium (In) having an absorption peak in an ultraviolet wavelength range and silver (Ag) having an absorption peak in a blue wavelength region were used as the metal nanoparticles. More specifically, the metal nanoparticles of Example 1 are core-shell particles (also referred to as In50Ag50 nanoparticles) in which the core is made of Ag and the shell is made of In and a weight ratio of In and Ag is 50:50. The core made of Ag had a particle size of 5 nm, and the shell made of In had a thickness of 8 nm. In forming the shell may be $In_2O_3$ during the formation process. In Example 1, the polymer layer was formed using a photoreactive polymer having a photoisomerizable photoreactive group. Hereinafter, a method of producing the retardation substrate of Example 1 will be specifically described.

First, a photo-alignment film material in which a powder of the metal nanoparticles of Example 1 was dispersed in a solvent containing the photoreactive polymer of Example 1 was applied onto a substrate by spin coating at a speed of 2000 rpm and pre-baked at 70° C. for 90 seconds, and then polarized ultraviolet light having a wavelength of 365 nm was irradiated at 400 mJ/cm$^2$. Here, due to a tact time of a production line, the irradiation amount could not be set to 400 mJ/cm$^2$ or more. Thereafter, post-baking was performed at 230° C. for 30 minutes to produce the photo-alignment film of Example 1. The photo-alignment film of Example 1 contained 10$^{15}$ metal nanoparticles/(cm$^2$×100 nm), and the thickness of the polymer layer was 100 nm.

Figure 8:
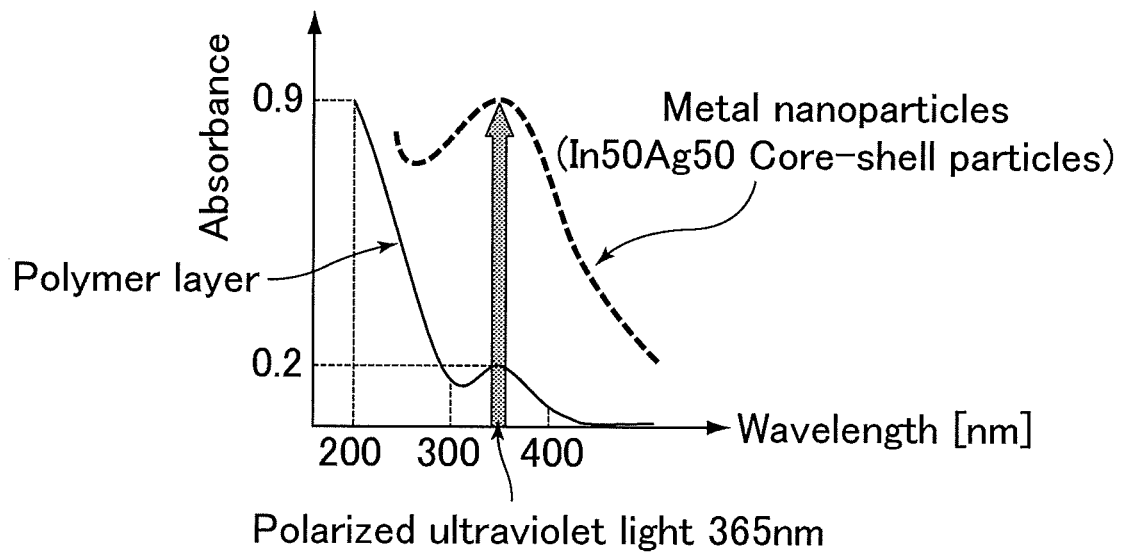
FIG. 8 is absorption spectra of a polymer layer and metal nanoparticles contained in a photo-alignment film of Example 1.

FIG. 8 is absorption spectra of a polymer layer and metal nanoparticles contained in the photo-alignment film of Example 1. As shown in FIG. 8, the polymer layer of Example 1 had an absorption peak at 365 nm, and the absorbance at the absorption peak was 0.2. The metal nanoparticles of Example 1 had an absorption peak at 365 nm, and the absorbance at the absorption peak was 0.9. In the examples and comparative examples in the present specification, since the components of the polymer layer and the components of the metal nanoparticles used in the photo-alignment film are known, the absorption spectrum of the polymer layer is determined by forming the material of the polymer layer before the metal nanoparticles are dispersed into a film having the thickness of the polymer layer in the photo-alignment film and then measuring the absorbance for each wavelength. The absorption spectrum of the metal nanoparticles was determined by dispersing the metal nanoparticles before being dispersed in the polymer layer in water so that the metal nanoparticles had the same concentration as the metal nanoparticles in the photo-alignment film, then putting the resultant dispersion in the cell for measuring the absorbance, and measuring the absorbance for each wavelength. In the photo-alignment film of Example 1, metal nanoparticles having an absorbance of 0.9 are dispersed in a polymer layer having an absorbance of 0.2. Therefore, in Example 1, almost all irradiated polarized ultraviolet light of 400 mJ/cm$^2$ can be absorbed by the photo-alignment film. On the other hand, in a case where a photo-alignment film that is the same as in Example 1 except that no metal nanoparticles are included is produced, when polarized ultraviolet light of 400 mJ/cm$^2$ is about to be absorbed by the photo-alignment film, the irradiation amount needs to be 2 J/cm$^2$. Thus, in this example in which polarized ultraviolet light of 400 mJ/cm$^2$ is irradiated, it is possible to absorb substantially the same amount of polarized ultraviolet light as when polarized ultraviolet light of 2 J/cm$^2$ is irradiated in the production of a photo-alignment film including no metal nanoparticles, and the alignment function of the photo-alignment film can be sufficiently exerted while suppressing the irradiation amount of the polarized ultraviolet light in the photo-alignment treatment. The reason for this is considered as follows. That is, in this example, polarized ultraviolet light is absorbed not only by the polymer layer but also by the metal nanoparticles. The absorbed energy changes its form into an enhanced electric field near the metal nanoparticles, and acts on the polymer layer near the metal nanoparticles. This makes it possible to develop the alignment function of the entire photo-alignment film by using a smaller irradiation amount of polarized ultraviolet light.

A retardation layer forming material having a mesogen group and containing an acrylic monomer that reacts with ultraviolet light having a wavelength of 365 nm was formed into a film on the photo-alignment film of Example 1, a retardation layer was formed by irradiating the retardation layer forming material with ultraviolet light of 365 nm, and the retardation substrate of Example 1 in which the retardation layer was provided on the photo-alignment film was produced. Contrast of the retardation substrate of Example 1 was 6,500. As described above, in Example 1, even if the irradiation amount of the polarized ultraviolet light was suppressed in the alignment treatment of the photo-alignment film, the alignment function of the photo-alignment film could be sufficiently exerted. Therefore, it was considered that a high contrast ratio could be realized in the retardation substrate of Example 1.

Coloring of the retardation substrate of Example 1 in a visible region was visually evaluated, and overall evaluation was performed in five steps in consideration of the contrast ratio of the retardation substrate and coloring in the visible region. The results are shown in Tables 1-1, 1-2, 1-3, and 1-4 below. Overall evaluation was performed according to the following criteria. If an overall evaluation score is 2 or more, it can be said that the contrast ratio of the retardation substrate is high and the alignment function of the photo-alignment film has been sufficiently enhanced.

—Overall evaluation—
1: The contrast ratio is 3000 or less.
2: The contrast ratio is more than 3000 and 5000 or less.
3: The contrast ratio is more than 5000 and less than 7000.
4: The contrast ratio is 7000 or more, and slightly yellow coloring is observed.
5: The contrast ratio is 7000 or more, and no coloring is observed.

TABLE 1-1

| | | Example 1 | Example 2 | Example 3 |
|---|---|---|---|---|
| Polymer layer | Type of photoreactive polymer | Photoisomerizable type | Mixture of photodimerizable type and photoisomerizable type | Photodecomposable type |
| | Absorption wavelength of polymer layer (Thickness: 100 nm) | 365 nm | 313 nm | 254 nm |
| | Absorbance | 0.2 | 0.7 | 0.4 |
| Metal nanoparticles | Material | In50Ag50 nanoparticles | In10Ag90 nanoparticles | Al nanoparticles |
| | Particle size | 13 nm | 13 nm | 20 nm |
| | Concentration (particles/cm$^2$ × 100 nm) | $10^{15}$ | $10^{15}$ | $10^{15}$ |
| | Absorption wavelength | 365 nm | 310 nm | 250 nm |
| | Absorbance | 0.9 | 0.9 | 0.9 |
| Photo-alignment film | Difference in absorption wavelength between polymer layer and metal nanoparticles | 0 | 3 | 4 |
| | Absorbance ratio (absorbance of metal nanoparticles/absorbance of polymer layer) | 4.50 | 1.29 | 2.25 |
| Irradiation amount of polarized UV light on photo-alignment film | | 400 mJ/cm$^2$ | 2 mJ/cm$^2$ | 140 mJ/cm$^2$ |
| Contrast ratio of retardation substrate | | 6500 | 7000 | 7200 |
| Coloring in visible region (visual evaluation) | | More yellowish than Comparative Example 1 | Slightly yellowish | Achromatic |
| Overall evaluation | | 3 | 4 | 3 |

TABLE 1-2

| | | Example 4 | Example 5 | Example 6 |
|---|---|---|---|---|
| Polymer layer | Type of photoreactive polymer | Photoisomerizable type | Photoisomerizable type | Photodecomposable type |
| | Absorption wavelength of polymer layer (Thickness: 100 nm) | 365 nm | 365 nm | 254 nm |
| | Absorbance | 0.2 | 0.7 | 0.4 |
| Metal nanoparticles | Material | Ag nanoparticles | In nanoparticles | Al nanoparticles |
| | Particle size | 13 nm | 13 nm | 20 nm |
| | Concentration (particles/cm$^2$ × 100 nm) | $10^{15}$ | $10^{15}$ | $10^{18}$ |
| | Absorption wavelength | 410 nm | 270 nm | 250 nm |
| | Absorbance | 0.5 | 0.2 | 1.1 |

TABLE 1-2-continued

|  |  | Example 4 | Example 5 | Example 6 |
|---|---|---|---|---|
| Photo-alignment film | Difference in absorption wavelength between polymer layer and metal nanoparticles | 45 | 95 | 4 |
|  | Absorbance ratio (absorbance of metal nanoparticles/absorbance of polymer layer) | 2.50 | 0.29 | 2.75 |
| Irradiation amount of polarized UV light on photo-alignment film |  | 400 mJ/cm$^2$ | 400 mJ/cm$^2$ | 100 mJ/cm$^2$ |
| Contrast ratio of retardation substrate |  | 4500 | 3800 | 7200 |
| Coloring in visible region (visual evaluation) |  | Much more yellowish than Comparative Example 1 | Almost achromatic | Achromatic |
| Overall evaluation |  | 2 | 2 | 5 |

TABLE 1-3

|  |  | Example 7 | Example 8 |
|---|---|---|---|
| Polymer layer | Type of photoreactive polymer | Photodecomposable type | Photoisomerizable type |
|  | Absorption wavelength of polymer layer (Thickness: 100 nm) | 254 nm | 365 nm |
|  | Absorbance | 0.4 | 0.05 |
| Metal nanoparticles | Material | Al nanoparticles | In50Ag50 nanoparticles |
|  | Particle size | 20 nm | 13 nm |
|  | Concentration (particles/cm$^2$ × 100 nm) | 10$^{10}$ | 10$^{15}$ |
|  | Absorption wavelength | 250 nm | 365 nm |
|  | Absorbance | 0.1 | 1.1 |
| Photo-alignment film | Difference in absorption wavelength between polymer layer and metal nanoparticles | 4 | 0 |
|  | Absorbance ratio (absorbance of metal nanoparticles/absorbance of polymer layer) | 0.25 | 22 |
| Irradiation amount of polarized UV light on photo-alignment film |  | 100 mJ/cm$^2$ | 400 mJ/cm$^2$ |
| Contrast ratio of retardation substrate |  | 3500 | 5800 |
| Coloring in visible region (visual evaluation) |  | Achromatic | More yellowish than Comparative Example 1 |
| Overall evaluation |  | 2 | 3 |

TABLE 1-4

|  |  | Comparative Example 1 | Comparative Example 2 | Comparative Example 3 |
|---|---|---|---|---|
| Polymer layer | Type of photoreactive polymer | Photoisomerizable type | Photoisomerizable type | Photoisomerizable type |
|  | Absorption wavelength of polymer layer (Thickness: 100 nm) | 365 nm | 365 nm | 365 nm |
|  | Absorbance | 0.2 | 0.2 | 0.7 |
| Metal nanoparticles | Material | — | Ag nanoparticles | Ag nanoparticles |
|  | Particle size | — | 13 nm | 13 nm |
|  | Concentration (particles/cm$^2$ × 100 nm) | 0 | 10$^{20}$ | 10$^{20}$ |
|  | Absorption wavelength | — | 410 nm | 410 nm |
|  | Absorbance | — | 4 | 0.1 |

TABLE 1-4-continued

|  |  | Comparative Example 1 | Comparative Example 2 | Comparative Example 3 |
|---|---|---|---|---|
| Photo-alignment film | Difference in absorption wavelength between polymer layer and metal nanoparticles | — | 45 | 45 |
|  | Absorbance ratio (absorbance of metal nanoparticles/absorbance of polymer layer) | — | 20 | 0.14 |
| Irradiation amount of polarized UV light on photo-alignment film |  | 400 mJ/cm$^2$ | 400 mJ/cm$^2$ | 400 mJ/cm$^2$ |
| Contrast ratio of retardation substrate |  | 3000 | up to 3000 | 2500 |
| Coloring in visible region (visual evaluation) |  | Yellowish | Yellowish | Slightly yellowish |
| Overall evaluation |  | 1 | 1 | 1 |

Comparative Example 1

Figure 9:
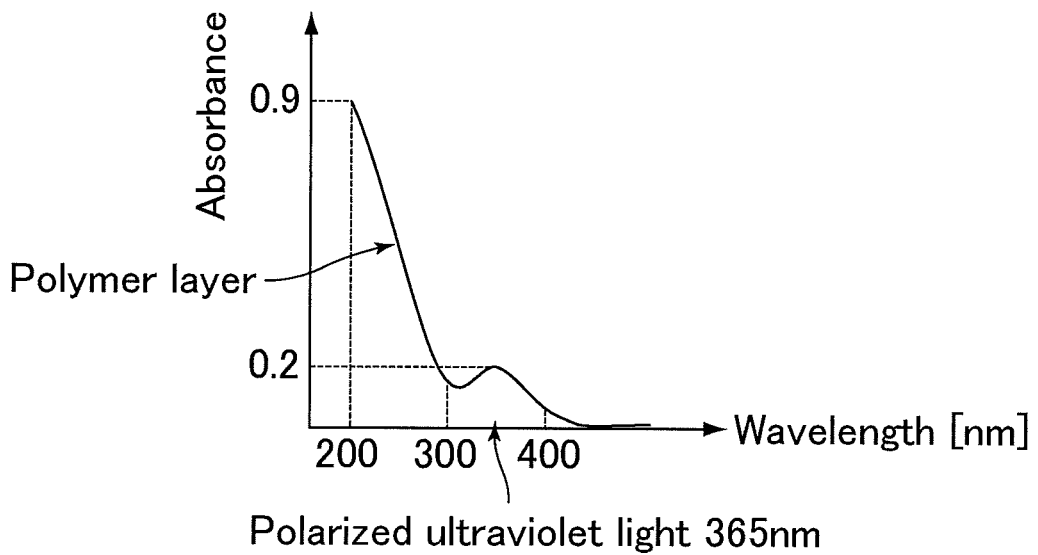
FIG. 9 is an absorption spectrum of a polymer layer contained in a photo-alignment film of Comparative Example 1.

A retardation substrate of Comparative Example 1 was produced in the same manner as the retardation substrate of Example 1, except that no metal nanoparticles were included in the photo-alignment film and the order of the post-baking was changed. In Example 1, the polarized ultraviolet light was irradiated between the pre-baking and the post-baking. However, in Comparative Example 1, the polarized ultraviolet light was irradiated, and then the post-baking was performed. FIG. 9 is an absorption spectrum of a polymer layer contained in a photo-alignment film of Comparative Example 1. As shown in FIG. 9, the polymer layer of Comparative Example 1 had an absorption peak at 365 nm, and the absorbance at the absorption peak was 0.2. Contrast of the retardation substrate having the retardation layer formed on the photo-alignment film of Comparative Example 1 was approximately 3000. Since the polymer layer of Comparative Example 1 contained no metal nanoparticles, the amount of polarized ultraviolet light absorbed in the alignment treatment of the photo-alignment film of Comparative Example 1 was not sufficient, and the alignment function of the photo-alignment film could not be sufficiently exerted, so that it was considered that the contrast ratio of the retardation substrate of Comparative Example 1 was lowered. In order for the photo-alignment film of Comparative Example 1 to absorb the same level of polarized ultraviolet light as the photo-alignment film of Example 1, it is necessary to apply polarized ultraviolet light of 2 J/cm$^2$. When the polarized ultraviolet light of 2 J/cm$^2$ was irradiated in the alignment treatment of the photo-alignment film of Comparative Example 1, the contrast ratio of the retardation substrate became 7000.

With respect to the retardation substrate of Comparative Example 1, evaluation of coloring in the visible region and overall evaluation were performed in the same manner as in Example 1. The results are shown in Table 1 above.

Example 2

In Example 2, the retardation substrate of Embodiment 2 was produced. In Example 2, core-shell particles composed of an alloy of indium (In) having an absorption peak in an ultraviolet wavelength range and silver (Ag) having an absorption peak in a blue wavelength region were used as the metal nanoparticles. More specifically, the metal nanoparticles of Example 2 are core-shell particles (also referred to as In10Ag90 nanoparticles) in which the core is made of Ag and the shell is made of In and a weight ratio of In and Ag is 10:90. The core made of Ag had a particle size of 5 nm, and the shell made of In had a thickness of 8 nm. In forming the shell may be In$_2$O$_3$ during the formation process. In Example 2, the polymer layer was formed using a photoreactive polymer having a photodimerizable or photoisomerizable photoreactive group. Hereinafter, a method of producing the retardation substrate of Example 2 will be specifically described.

First, a photo-alignment film material in which a powder of the metal nanoparticles of Example 2 was dispersed in a solvent containing the photoreactive polymer of Example 2 was applied onto a substrate by spin coating at a speed of 2000 rpm and pre-baked at 70° C. for 90 seconds, and then polarized ultraviolet light having a wavelength of 313 nm was irradiated at 3.5 mJ/cm$^2$ to produce the photo-alignment film of Example 2. Thereafter, a retardation substrate was formed through post-baking at 140° C. for 10 minutes. The photo-alignment film of Example 2 contained 10$^{15}$ metal nanoparticles/(cm$^2$×100 nm), and the thickness of the polymer layer was 100 nm.

Figure 10:
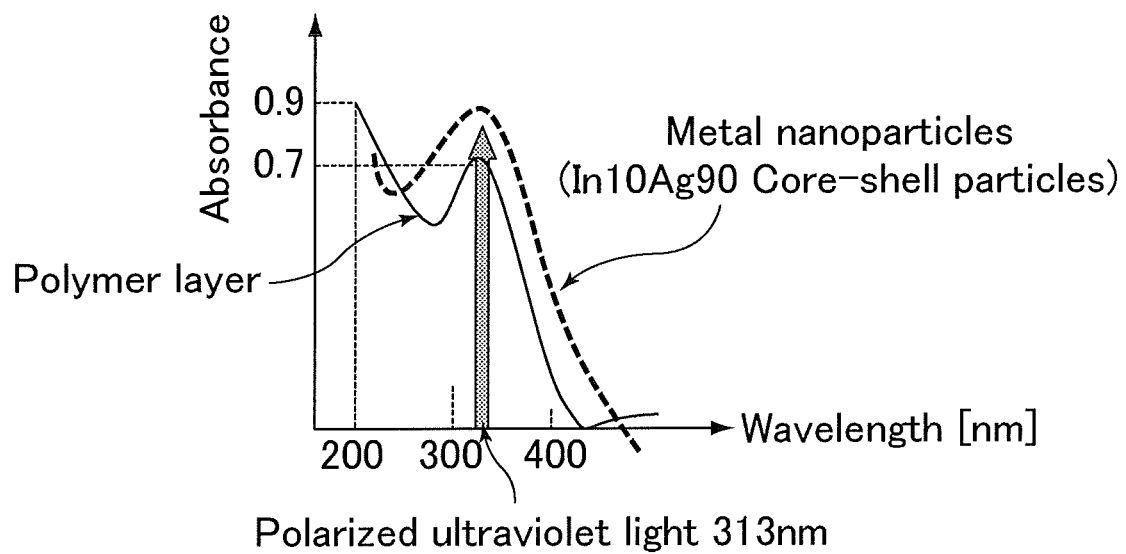
FIG. 10 is absorption spectra of a polymer layer and metal nanoparticles contained in a photo-alignment film of Example 2.

FIG. 10 is absorption spectra of a polymer layer and metal nanoparticles contained in the photo-alignment film of Example 2. As shown in FIG. 10, the polymer layer of Example 2 had an absorption peak at 313 nm, and the absorbance at the absorption peak was 0.7. The metal nanoparticles of Example 2 had an absorption peak at 310 nm, and the absorbance at the absorption peak was 0.9. In the photo-alignment film of Example 2, metal nanoparticles having an absorbance of 0.9 are dispersed in a polymer layer having an absorbance of 0.7. Therefore, in Example 2, almost all irradiated polarized ultraviolet light of 3.5 mJ/cm$^2$ can be absorbed by the photo-alignment film. On the other hand, in a case where a photo-alignment film that is the same as in Example 2 except that no metal nanoparticles are contained is produced, when polarized ultraviolet light of 3.5 mJ/cm$^2$ is about to be absorbed by the photo-alignment film, the irradiation amount needs to be 5 mJ/cm$^2$. Thus, in the present example in which polarized ultraviolet light of 3.5 mJ/cm$^2$ is irradiated, it is possible to absorb substantially the same amount of polarized ultraviolet light as when polarized ultraviolet light of 5 mJ/cm$^2$ is irradiated in the production of a photo-alignment film including no metal nanoparticles, and the alignment function of the photo-alignment film can be sufficiently exerted while suppressing the irradiation amount of the polarized ultraviolet light in the photo-alignment treatment. The reason is considered to be the same as in Example 1.

A retardation layer was formed on the photo-alignment film of Example 2 in the same manner as in Example 1, and the retardation substrate of Example 2 having the retardation layer provided on the photo-alignment film was produced. Contrast of the retardation substrate of Example 2 was 7000. As described above, in Example 2, even if the irradiation amount of the polarized ultraviolet light was suppressed in the alignment treatment of the photo-alignment film, the alignment function of the photo-alignment film could be sufficiently exerted. Therefore, it was considered that a high contrast ratio could be realized in the retardation substrate of Example 2.

Coloring of the retardation substrate of Example 2 in a visible region was visually evaluated, and overall evaluation was performed in five steps in consideration of the contrast ratio of the retardation substrate and coloring in the visible region. The results are shown in Table 1 above.

Example 3

In Example 3, the retardation substrate of Embodiment 2 was produced. In Example 3, Al nanoparticles made of aluminum (Al) having an absorption peak in a deep ultraviolet wavelength region were used as metal nanoparticles. The particle size of the Al nanoparticles was 20 nm. In Example 3, the polymer layer was formed using a photoreactive polymer having a photodecomposable photoreactive group. Hereinafter, a method of producing the retardation substrate of Example 3 will be specifically described.

First, a photo-alignment film material in which a powder of the metal nanoparticles of Example 3 was dispersed in a solvent containing the photoreactive polymer of Example 3 was applied onto a substrate by spin coating at a speed of 2000 rpm and pre-baked at 80° C. for 90 seconds, and then subjected to post-baking at 230° C./30 minutes, and polarized ultraviolet light having a wavelength of 254 nm was irradiated at 140 mJ/cm$^2$. Thereafter, post-baking was performed at 230° C./30 minutes to produce the photo-alignment film of Example 3. The photo-alignment film of Example 3 contained $10^{15}$ metal nanoparticles/(cm$^2$×100 nm), and the thickness of the polymer layer was 100 nm. In this example, since the photoreactive polymer having a photodecomposable photoreactive group was used, a total of two times of post-bakings were performed before and after irradiation with polarized ultraviolet light. The post-baking before irradiation with polarized ultraviolet light is for creating a trigger for improving alignability, and the post-baking after irradiation with polarized ultraviolet light is intended to sublimate and reduce decomposition products.

Figure 11:
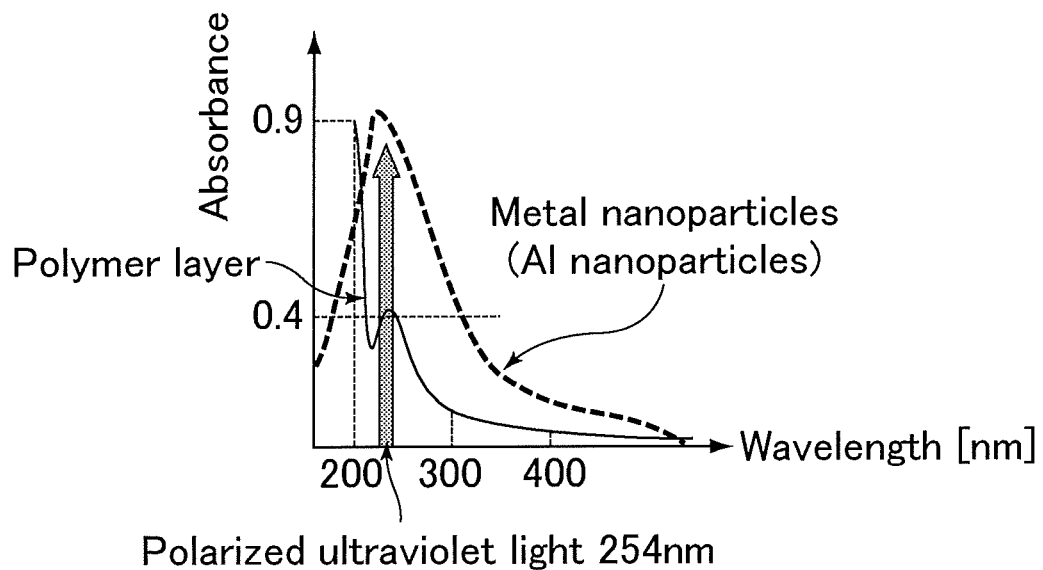
FIG. 11 is absorption spectra of a polymer layer and metal nanoparticles contained in a photo-alignment film of Example 3.

FIG. 11 is absorption spectra of a polymer layer and metal nanoparticles contained in the photo-alignment film of Example 3. As shown in FIG. 11, the polymer layer of Example 3 had an absorption peak at 254 nm, and the absorbance at the absorption peak was 0.4. The metal nanoparticles of Example 3 had an absorption peak at 250 nm, and the absorbance at the absorption peak was 0.9. In the photo-alignment film of Example 3, metal nanoparticles having an absorbance of 0.9 are dispersed in a polymer layer having an absorbance of 0.4. Therefore, in Example 3, almost all irradiated polarized ultraviolet light of 140 mJ/cm$^2$ can be absorbed by the photo-alignment film. On the other hand, in a case where a photo-alignment film that is the same as in Example 3 except that no metal nanoparticles are contained is produced, when polarized ultraviolet light of 140 mJ/cm$^2$ is about to be absorbed by the photo-alignment film, the irradiation amount needs to be 250 mJ/cm$^2$. Thus, in this example in which polarized ultraviolet light of 140 mJ/cm$^2$ is irradiated, it is possible to absorb substantially the same amount of polarized ultraviolet light as when polarized ultraviolet light of 250 mJ/cm$^2$ is irradiated in the production of a photo-alignment film including no metal nanoparticles, and the alignment function of the photo-alignment film can be sufficiently improved while suppressing the irradiation amount of the polarized ultraviolet light in the photo-alignment treatment. The reason is considered to be the same as in Example 1.

A retardation layer was formed on the photo-alignment film of Example 3 in the same manner as in Example 1, and the retardation substrate of Example 3 having the retardation layer provided on the photo-alignment film was produced. Contrast of the retardation substrate of Example 3 was 7,200. As described above, in Example 3, even if the irradiation amount of the polarized ultraviolet light was suppressed in the alignment treatment of the photo-alignment film, the alignment function of the photo-alignment film could be sufficiently improved. Therefore, it was considered that a high contrast ratio could be realized in the retardation substrate of Example 3.

Coloring of the retardation substrate of Example 3 in a visible region was visually evaluated, and overall evaluation was performed in five steps in consideration of the contrast ratio of the retardation substrate and coloring in the visible region. The results are shown in Table 1 above.

Examples 4, 5, and 8

Retardation substrates of Examples 4, 5, and 8 were produced in the same manner as in Example 1, except that conditions were changed as shown in Table 1, and evaluation of contrast ratio, evaluation of coloring in the visible region, and overall evaluation were performed. The results are shown in Table 1 above.

Examples 6 and 7

Retardation substrates of Examples 6 and 7 were produced in the same manner as in Example 3, except that conditions were changed as shown in Table 1, and evaluation of contrast ratio, evaluation of coloring in the visible region, and overall evaluation were performed. The results are shown in Table 1 above.

Comparative Example 2

A retardation substrate of Comparative Example 2 was produced in the same manner as in Example 1, except that conditions were changed as shown in Table 1, and evaluation of contrast ratio, evaluation of coloring in the visible region, and overall evaluation were performed. The results are shown in Table 1 above.

Comparative Example 3

A retardation substrate of Comparative Example 3 was produced in the same manner as in Example 1, except that conditions were changed as shown in Table 1 and the speed at which a photo-alignment film material was applied onto a substrate by spin coating was less than 2000 rpm, and evaluation of contrast ratio, evaluation of coloring in the visible region, and overall evaluation were performed. The results are shown in Table 1 above.

Evaluation of Examples 1 to 8 and Comparative Examples 1 to 3

In all the retardation substrates of Examples 1 to 8 in which $10^9$ or more and $10^{19}$ or less metal nanoparticles/(cm²×100 nm) were included in the photo-alignment film and an absorbance ratio of the metal nanoparticles to the polymer layer was 0.2 or more and 25 or less, the contrast ratio exceeded 3000, and the retardation substrates had good contrast. On the other hand, in the retardation substrate of Comparative Example 1, since no metal nanoparticles were included in the photo-alignment film, the absorbed amount of polarized ultraviolet light of the photo-alignment film was not sufficient, and the alignment function of the photo-alignment film could not be sufficiently improved, so that it was considered that the contrast ratio was lowered. Although the retardation substrates of Comparative Examples 2 and 3 included metal nanoparticles in the photo-alignment film, the contrast ratio was as small as 3000 or less. In Comparative Example 2, the concentration of the metal nanoparticles was high, and metal nanoparticles were partially aggregated, so that the in-plane unevenness and the shift in resonance wavelength occurred, and it was considered that the contrast ratio was lowered. In Comparative Example 3, the speed at which the photo-alignment film material was applied onto the substrate was lower than that in Comparative Example 2, so that the aggregation of the metal nanoparticles proceeded further than in Comparative Example 2, and it was considered that the contrast ratio was lower than in Comparative Example 2.

In Examples 1 to 3, the effect of improving the contrast ratio was larger than in Examples 4 and 5. In Examples 4 and 5, a difference between the absorption wavelength of the metal nanoparticles and the absorption wavelength of the polymer layer was 30 nm or more. However, in Examples 1 to 3, the difference between the absorption wavelength of the metal nanoparticles and the absorption wavelength of the polymer layer was as small as less than 30 nm. As described above, in Examples 1 to 3, the difference between the absorption wavelength of the metal nanoparticles and the absorption wavelength of the polymer layer was smaller than that in Examples 4 and 5, so that in Examples 1 to 3 the metal nanoparticles could absorb the polarized ultraviolet light more efficiently than in Examples 4 and 5, and it was considered that the effect of improving the contrast ratio of the retardation substrate was large.

In Examples 1 to 3, 6 and 8, the effect of improving the contrast ratio was larger than in Example 7. In Example 7, the absorbance ratio was less than 1. However, in Examples 1 to 3, 6 and 8, the absorbance ratio was 1 or more. In Examples 1 to 3, 6 and 8, a ratio of polarized ultraviolet light absorbed by the metal nanoparticles was higher than in Example 7; therefore, the metal nanoparticles could more sufficiently absorb the polarized ultraviolet light, and it was considered that the effect of improving the contrast ratio of the retardation substrate was large.

According to Examples 1 to 8, yellow coloring was suppressed as the absorption wavelength of the metal nanoparticles approached a short wavelength side, and coloring was not confirmed when the absorption wavelength of the metal nanoparticles was 300 nm or less. This was probably because absorption of visible light by the metal nanoparticles was suppressed as the absorption wavelength of the metal nanoparticles approached the short wavelength side.

Example 9

Figure 12:
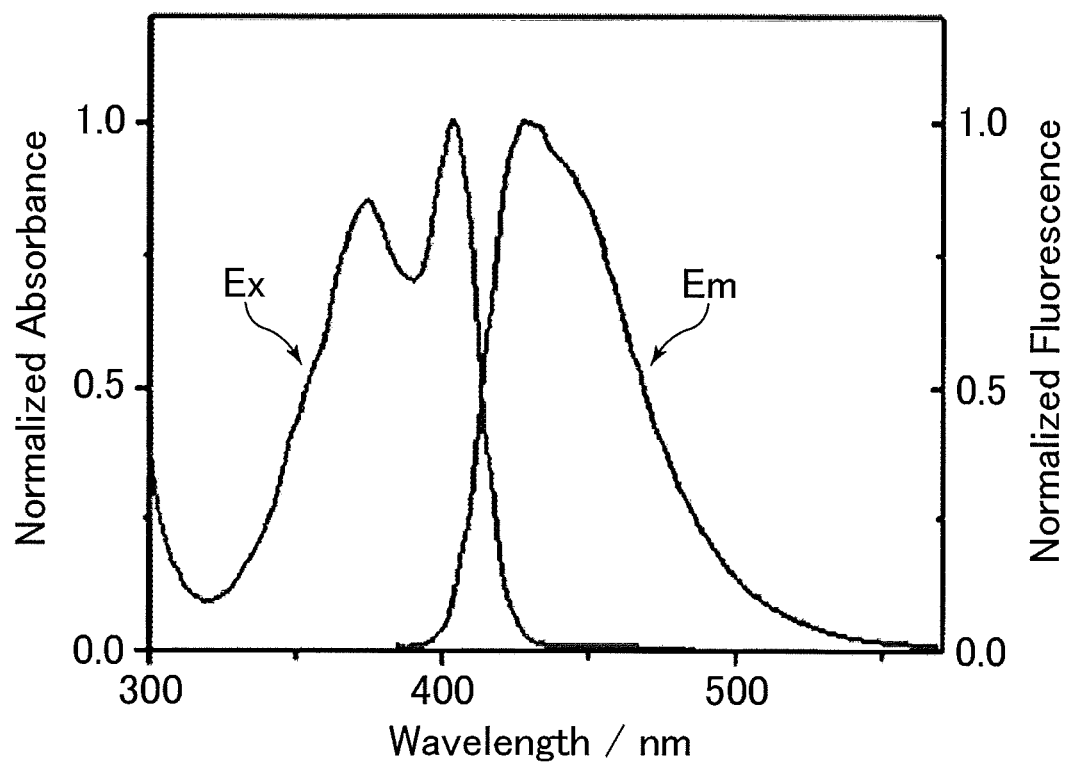
FIG. 12 is an absorption spectrum and a fluorescence spectrum of a dye contained in a photo-alignment film of Example 9.

FIG. 12 is an absorption spectrum and a fluorescence spectrum of a dye contained in a photo-alignment film of Example 9. In FIG. 12, Ex represents an absorption spectrum, and Em represents an emission spectrum. In Example 9, the retardation substrate of Embodiment 2 was produced.

The retardation substrate of Example 9 has the same configuration as the retardation substrate of Example 1, except that a phosphor is dispersed in the photo-alignment film. More specifically, in Example 9, a dye (Alexa Fluor 405 (registered trademark) manufactured by Thermo Fisher Scientific) is dispersed as a phosphor in the photo-alignment film of Example 1. FIG. 12 shows the absorption spectrum and fluorescence spectrum of the dye. The absorption spectrum and the fluorescence spectrum of the dye are the results measured at pH 7.4 in phosphate buffered saline (PBS). As shown in FIG. 12, the dye used in Example 9 had an absorption peak at 365 nm and an emission peak at 428 nm. The dye also had an absorption peak at 404 nm, and a normalized absorbance at a wavelength of 404 nm was larger than the normalized absorbance at a wavelength of 365 nm. Hereinafter, a method of producing the retardation substrate of Example 9 will be specifically described.

Figure 13:
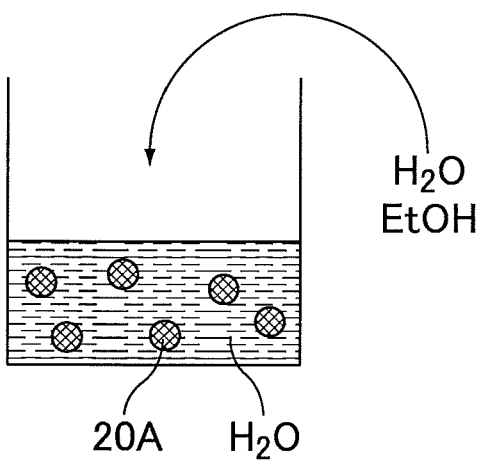
FIG. 13 is a schematic view showing Procedure 1 in a method for producing dye-containing silica-coated metal nanoparticles of Example 9.
Figure 14:
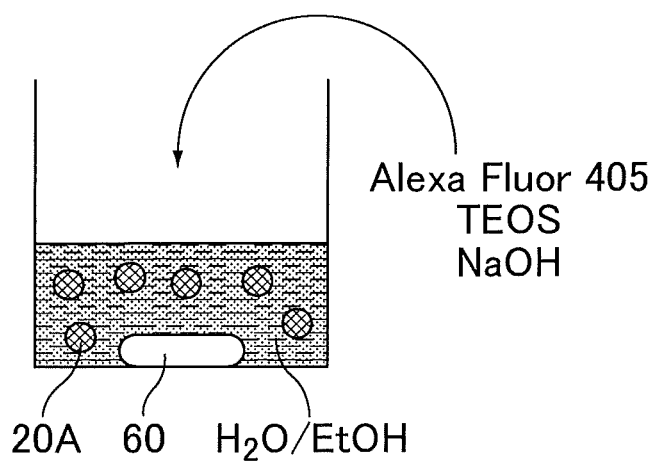
FIG. 14 is a schematic view showing Procedure 2 in the method for producing the dye-containing silica-coated metal nanoparticles of Example 9.
Figure 15:
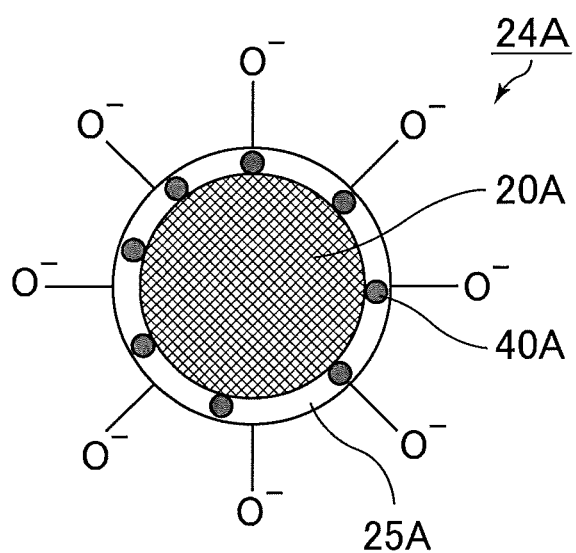
FIG. 15 is a schematic cross-sectional view of the dye-containing silica-coated metal nanoparticles of Example 9.
Figure 16:
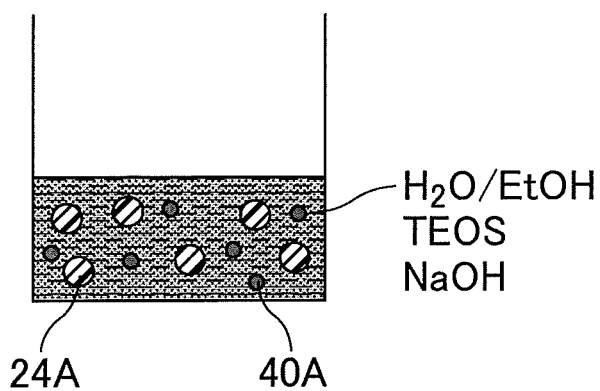
FIG. 16 is a schematic view showing Procedure 3 in the method for producing the dye-containing silica-coated metal nanoparticles of Example 9.

First, a method for producing dye-containing silica-coated metal nanoparticles in which the above-described dye is disposed near the metal nanoparticles of Example 1 will be described. A hydrolysis/polycondensation reaction of Tetraethyl orthosilicate (TEOS) was used as a means for forming silica. FIG. 13 is a schematic view showing Procedure 1 in the method for producing the dye-containing silica-coated metal nanoparticles of Example 9. FIG. 14 is a schematic view showing Procedure 2 in the method for producing the dye-containing silica-coated metal nanoparticles of Example 9. FIG. 15 is a schematic cross-sectional view of the dye-containing silica-coated metal nanoparticles of Example 9. FIG. 16 is a schematic view showing Procedure 3 in the method for producing the dye-containing silica-coated metal nanoparticles of Example 9. The method for producing the dye-containing silica-coated metal nanoparticles will be described with reference to FIGS. 13 to 16.

—Procedure 1—

As shown in FIG. 13, 1.22 ml of ethanol was added to 0.38 ml (the particle dispersion medium was water) of an aqueous solution ($3.0 \times 10^{15}$ particles/mL) of In50Ag50 nanoparticles 20A having a particle size of 13 nm, which were the metal nanoparticles of Example 1. At that time, the concentration of water with respect to ethanol in the reaction system was 55.6 M. Citrate was used as a dispersion stabilizer for the In50Ag50 nanoparticles 20A. If the ratio is other than 55.6 M, for example, 10 M, 20 M, 30 M or 70 M, the particle size becomes irregular, and in addition, the particles are aggregated, so that a plasmon resonance phenomenon may not appear in a desired wavelength range.

—Procedure 2—

As shown in FIG. 14, to the solution prepared in Procedure 1, 0.2 ml of an ethanol solution (concentration: $1.0 \times 10^{-2}$ M) of the dye (Alexa Fluor 405) was added, and the mixture was sufficiently stirred using a rotor 60. Thereafter, 0.2 ml of an ethanol solution (concentration: $1.0 \times 10^{-3}$ M) of Tetraethoxysilane (TEOS) was added, and the mixture was sufficiently stirred. At that time, the temperature of a water bath was kept constant at 35° C. In 15 minutes after the addition of TEOS, 0.2 ml of an aqueous solution (concentration: 0.1 M) of NaOH as a base catalyst was added, and the solution was reacted for about 6 hours while stirring. At that time, the concentration of water with respect to ethanol in the reaction system was 55.6 M. The volume of the prepared solution was 2 ml.

—Procedure 3—

After the reaction according to Procedure 2, a solution of dye-containing silica-coated metal nanoparticles 24A shown in FIG. 15 was obtained. As shown in FIG. 15, the dye-containing silica-coated metal nanoparticles 24A have a structure in which the In50Ag50 nanoparticles 20A are coated with a silica film 25A, and a dye 40A is contained in the silica film 25A.

As shown in FIG. 16, the solution of the dye-containing silica-coated metal nanoparticles 24A obtained after the reaction according to Procedure 2 contained impurities such as the excess dye 40A and NaOH. Therefore, the following Procedure 4 was performed. Here, when the dye-containing silica-coated metal nanoparticles 24A are dispersed in water, as shown in FIG. 15, an OH group on the silica surface undergoes a deprotonation reaction and is negatively charged with $O^-$. In the particles prepared in Procedure 3, since the particle size distribution before and after silica coating can be measured by DLS measurement, the mode of the particle size of the particles obtained therefrom is found.

—Procedure 4—

The excess dye 40A present in the solution is removed by centrifuging the solution prepared in Procedure 3. That is, the centrifugation can separate a precipitate (reactant) from a supernatant, so that the supernatant is collected and then diluted with water. By repeating this process several times, the excess dye 40A was removed, and the dye-containing silica-coated metal nanoparticles 24A with a silica thickness of 5 nm were produced.

The retardation substrate of Example 9 was produced using the metal nanoparticles of Example 1 and the dye-containing silica-coated metal nanoparticles 24A composed of the above dye. Hereinafter, a specific production method will be described.

A photo-alignment film material obtained by dispersing the dye-containing silica-coated metal nanoparticles prepared in Procedures 1 to 4 in a solvent containing the photoreactive polymer of Example 1 was applied onto the substrate by spin coating at a speed of 2000 rpm, pre-baked at 70° C. for 90 seconds, and then irradiated with polarized ultraviolet light having a wavelength of 365 nm at 400 mJ/cm$^2$. Thereafter, post-baking was performed at 230° C. for 30 minutes to produce the photo-alignment film of Example 9. The photo-alignment film of Example 9 contained $10^{15}$ dye-containing silica-coated metal nanoparticles/(cm$^2$×100 nm), and the thickness of the polymer layer was 100 nm.

Figure 17:
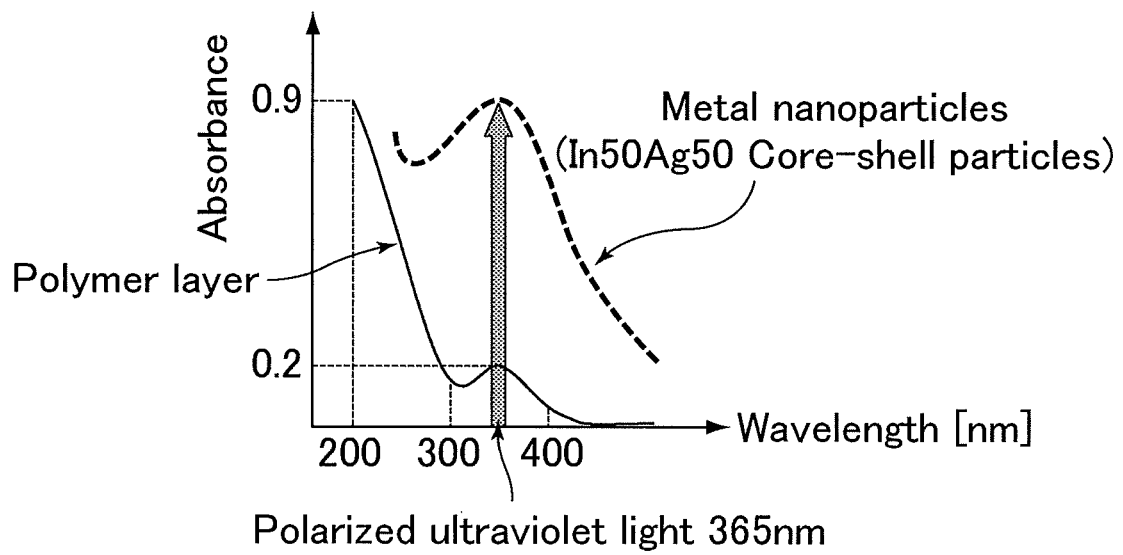
FIG. 17 is absorption spectra of a polymer layer and metal nanoparticles contained in the photo-alignment film of Example 9.

FIG. 17 is absorption spectra of a polymer layer and metal nanoparticles contained in the photo-alignment film of Example 9. As shown in FIG. 17, the polymer layer of Example 9 had an absorption peak at 365 nm, and the absorbance at the absorption peak was 0.2. The metal nanoparticles of Example 9 had an absorption peak at 365 nm, and the absorbance at the absorption peak was 0.9. Since the photo-alignment film of Example 9 is formed of the metal nanoparticles having an absorbance of 0.9 and the polymer layer having an absorbance of 0.2, almost all polarized ultraviolet light of 400 mJ/cm$^2$ irradiated in Example 9 can be absorbed. On the other hand, when the photo-alignment film does not contain metal nanoparticles, the photo-alignment film is formed of only the polymer layer having an absorbance of 0.2, so that if the polarized ultraviolet light of 400 mJ/cm$^2$ is about to be absorbed by the photo-alignment film, the irradiation amount needs to be 2 J/cm$^2$. Thus, the photo-alignment film in this example irradiated with the polarized ultraviolet light of 400 mJ/cm$^2$ can absorb substantially the same amount of polarized ultraviolet light as when polarized ultraviolet light of 2 J/cm$^2$ is applied to a photo-alignment film including no metal nanoparticles, and in the photo-alignment film in this example, the alignment function of the photo-alignment film can be sufficiently improved while suppressing the irradiation amount of the polarized ultraviolet light in the photo-alignment treatment. The reason can be considered similarly to Example 1.

A retardation layer was formed on the photo-alignment film of Example 9 in the same manner as in Example 1, and the retardation substrate of Example 9 having the retardation layer provided on the photo-alignment film was produced. Contrast of the retardation substrate of Example 9 was 6500. As described above, even if the irradiation amount of the polarized ultraviolet light was suppressed in the photo-alignment treatment for the photo-alignment film of Example 9, the alignment function of the photo-alignment film could be sufficiently improved. Therefore, it was considered that a high contrast ratio could be realized in the retardation substrate of Example 9.

Figure 18:
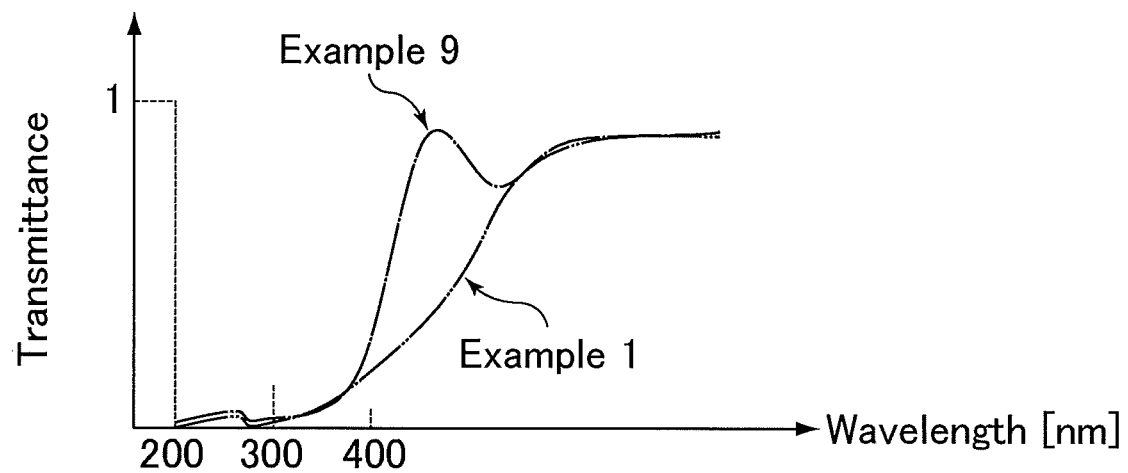
FIG. 18 is transmission spectra of retardation substrates of Examples 1 and 9.

In the retardation substrate of Example 9, coloring in the visible region was more suppressed than the retardation substrate of Example 1. In order to investigate the reason, the transmittance of the retardation substrates of Examples 1 and 9 was measured with respect to wavelength, and the transmission spectrum was obtained. FIG. 18 is transmission spectra of the retardation substrates of Examples 1 and 9. As shown in FIG. 18, in Example 9 in which the above-described dye was included in the photo-alignment film, the transmittance in a blue wavelength region (for example, a wavelength of 420 nm to 480 nm) increased as compared with Example 1 in which the dye was not included. This is presumably because external light formed an enhanced electric field near the metal nanoparticles, and the enhanced electric field acted on the dye, causing the dye to emit light in the blue wavelength region. Here, in the retardation substrate of Example 1, since the metal nanoparticles had an absorption peak in the wavelength region of 420 nm or less, only red and green lights passed through the retardation substrate, and the substrate appeared yellowish. However, in the retardation substrate of Example 9, the photo-alignment film included a dye having an absorption peak in the wavelength region of 300 nm or more and 400 nm or less and having an emission peak in the wavelength region of more than 400 nm and 450 nm or less, so that the enhanced electric field formed near the metal nanoparticles by external light can act on the dye, causing blue fluorescence to emit from the dye. As a result, as shown in FIG. 18, transmittance of blue light can be increased as compared with Example 1, yellow tint of the retardation substrate can be reduced as compared with Example 1, and it is considered that coloring in the visible region can be suppressed.

The embodiments of the present invention shown above may be combined as appropriate within the spirit of the present invention.

What is claimed is:

1. A photo-alignment film comprising:

a polymer layer containing a photoreactive polymer; and metal nanoparticles dispersed in the polymer layer at a concentration of $10^9$ particles/(cm$^2$×100 nm) or more and $10^{19}$ particles/(cm$^2$×100 nm) or less, the metal nanoparticles having an absorption peak in a wavelength region of 420 nm or less, an absorbance A1 being an absorbance at the absorption peak having largest absorbance in a wavelength region of 200 nm or more and 420 nm or less of the metal nanoparticles, an absorbance A2 being an absorbance at an absorption peak having largest absorbance in the wavelength region of 200 nm or more and 420 nm or less of the polymer layer, and the absorbance A1 and the absorbance A2 satisfying a relationship represented by the following formula 1:

$$0.2 \leq A1/A2 \leq 25 \quad \text{(Formula 1)}.$$

2. The photo-alignment film according to claim 1, wherein the absorbance A1 and the absorbance A2 satisfy a relationship represented by the following formula 2:

$$1 \leq A1/A2 \leq 25 \quad \text{(Formula 2)}.$$

3. The photo-alignment film according to claim 1, wherein the metal nanoparticles have the absorption peak in wavelength region of 300 nm or less.

4. The photo-alignment film according to claim 1, comprising the metal nanoparticles at a concentration of $10^{10}$ particles/(cm$^2$××100) or more and $10^{18}$ particles/(cm$^2$×100 nm) or less in the polymer layer.

5. The photo-alignment film according to claim 1, wherein the metal nanoparticles comprise at least one substance selected from the group consisting of silver, aluminum, indium, and alloys thereof.

6. The photo-alignment film according to claim 1, further comprising a light emitting body.

7. The photo-alignment film according to claim 6, wherein the light emitting body has an absorption peak in a wavelength region of 300 nm or more and 400 nm or less and has an emission peak in a wavelength region of more than 400 nm and 450 nm or less.

8. A retardation substrate comprising:
the photo-alignment film according to claim 1; and
a retardation layer containing a polymer that contains a mesogen group and a reactive group and provided on the photo-alignment film.

9. A liquid crystal display device comprising the photo-alignment film according to claim 1.

10. A method for producing a photo-alignment film, the method comprising:
forming a polymer layer by applying onto a substrate a photo-alignment film material containing a photoreactive polymer and metal nanoparticles, the metal nanoparticles being dispersed in the polymer layer at a concentration of $10^9$ particles/(cm$^2$×100 nm) or more and $10^{19}$ particles/(cm$^2$×100 nm) or less; and
irradiating polarized ultraviolet light to the polymer layer for producing the photo-alignment film, wherein:
the metal nanoparticles have an absorption peak in a wavelength region of 420 nm or less;
an absorbance A1 is an absorbance at the absorption peak having largest absorbance in a wavelength region of 200 nm or more and 420 nm or less of the metal nanoparticles;
an absorbance A2 is an absorbance at an absorption peak having largest absorbance in the wavelength region of 200 nm or more and 420 nm or less of the polymer layer; and
the absorbance A1 and the absorbance A2 satisfy a relationship represented by the following formula 1:

$$0.2 \leq A1/A2 \leq 25 \quad \text{(Formula 1)}.$$

* * * * *